United States Patent [19]
Kakizawa et al.

[11] Patent Number: 5,966,132
[45] Date of Patent: *Oct. 12, 1999

[54] THREE-DIMENSIONAL IMAGE SYNTHESIS WHICH REPRESENTS IMAGES DIFFERENTLY IN MULTIPLE THREE DIMENSIONAL SPACES

[75] Inventors: Takahiro Kakizawa, Yokohama; Takashi Yano, Kawasaki, both of Japan

[73] Assignee: Namco Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/596,236

[22] PCT Filed: Jun. 16, 1995

[86] PCT No.: PCT/JP95/01203

§ 371 Date: Feb. 16, 1996

§ 102(e) Date: Feb. 16, 1996

[87] PCT Pub. No.: WO95/35139

PCT Pub. Date: Dec. 28, 1995

[30] Foreign Application Priority Data

Jun. 17, 1994 [JP] Japan ................ 6-159270

[51] Int. Cl.$^6$ .................................................. G06F 15/62
[52] U.S. Cl. ............................................................. 345/419
[58] Field of Search ................................ 345/419, 421–2, 345/427, 429–31, 433–39, 114–15; 463/6, 31–34

[56] References Cited

U.S. PATENT DOCUMENTS 5,317,689  5/1994  Nack et al. .................. 345/507
5,367,615  11/1994  Economy et al. ............. 345/429

FOREIGN PATENT DOCUMENTS

| A-59-99477 | 6/1984 | Japan . |
| A-1-114990 | 5/1989 | Japan . |
| A-6-91054 | 4/1994 | Japan . |
| A-7-116342 | 5/1995 | Japan . |
| 94/28989 | 12/1994 | WIPO . |

*Primary Examiner*—Mark R. Powell
*Attorney, Agent, or Firm*—Oliff & Berridge, PLC

[57] ABSTRACT

An objective of this invention is to provide a three-dimensional(3D) simulator apparatus that can form a sub-screen on a main screen, wherein the formation of the sub-screen does not greatly affect the formation of the main screen. A virtual three-dimensional(3D) space computation section (100) performs computations for forming first and second virtual three-dimensional(3D) spaces in which are placed display objects having different numbers of polygons but the same position or position and orientation. An image synthesis section (200) synthesizes a field-of-view image as seen from any desired viewpoint in these first and second virtual 3D spaces, on the basis of computation results from the virtual 3D space computation section (100). The field-of-view image of the first virtual 3D space is displayed as a main screen on a CRT (10), and a field-of-view image of the second virtual 3D space displayed as a sub-screen (rear-view mirror) that is formed on the main screen. Texture information for forming the main and sub-screens is used in common.

22 Claims, 26 Drawing Sheets

FIG. 6

| OBJECT NUMBER | POSITION INFORMATION | | | ORIENTATION INFORMATION | | |
|---|---|---|---|---|---|---|
| $OB_0$ | $X_0$ | $Y_0$ | $Z_0$ | $\theta_0$ | $\phi_0$ | $\rho_0$ |
| $OB_1$ | $X_1$ | $Y_1$ | $Z_1$ | $\theta_1$ | $\phi_1$ | $\rho_1$ |
| $OB_2$ | $X_2$ | $Y_2$ | $Z_2$ | $\theta_2$ | $\phi_2$ | $\rho_2$ |
| $OB_3$ | $X_3$ | $Y_3$ | $Z_3$ | $\theta_3$ | $\phi_3$ | $\rho_3$ |
| $OB_4$ | $X_4$ | $Y_4$ | $Z_4$ | $\theta_4$ | $\phi_4$ | $\rho_4$ |
| ⋮ | ⋮ | ⋮ | ⋮ | ⋮ | ⋮ | ⋮ |
| $OB_{i-2}$ | $X_{m-2}$ | $Y_{m-2}$ | $Z_{m-2}$ | $\theta_{m-2}$ | $\phi_{m-2}$ | $\rho_{m-2}$ |
| $OB_{i-1}$ | $X_{m-1}$ | $Y_{m-1}$ | $Z_{m-1}$ | $\theta_{m-1}$ | $\phi_{m-1}$ | $\rho_{m-1}$ |
| $OB_i$ | $X_m$ | $Y_m$ | $Z_m$ | $\theta_m$ | $\phi_m$ | $\rho_m$ |

FIG. 8A

| OBJECT NUMBER | POSITION INFORMATION | | | ORIENTATION INFORMATION | | |
|---|---|---|---|---|---|---|
| $OB_0$ | $X_0$ | $Y_0$ | $Z_0$ | $\theta_0$ | $\phi_0$ | $\rho_0$ |
| $OB_1$ | $X_1$ | $Y_1$ | $Z_1$ | $\theta_1$ | $\phi_1$ | $\rho_1$ |
| $OB_2$ | $X_2$ | $Y_2$ | $Z_2$ | $\theta_2$ | $\phi_2$ | $\rho_2$ |
| $OB_3$ | $X_3$ | $Y_3$ | $Z_3$ | $\theta_3$ | $\phi_3$ | $\rho_3$ |
| $OB_4$ | $X_4$ | $Y_4$ | $Z_4$ | $\theta_4$ | $\phi_4$ | $\rho_4$ |
| ⋮ | ⋮ | ⋮ | ⋮ | ⋮ | ⋮ | ⋮ |
| $OB_{i-2}$ | $X_{m-2}$ | $Y_{m-2}$ | $Z_{m-2}$ | $\theta_{m-2}$ | $\phi_{m-2}$ | $\rho_{m-2}$ |
| $OB_{i-1}$ | $X_{m-1}$ | $Y_{m-1}$ | $Z_{m-1}$ | $\theta_{m-1}$ | $\phi_{m-1}$ | $\rho_{m-1}$ |
| $OB_i$ | $X_m$ | $Y_m$ | $Z_m$ | $\theta_m$ | $\phi_m$ | $\rho_m$ |

FIG. 8B

| OBJECT NUMBER | POSITION INFORMATION | | | ORIENTATION INFORMATION | | |
|---|---|---|---|---|---|---|
| $OB_{i+1}$ | $X_0$ | $Y_0$ | $Z_0$ | $\theta_0$ | $\phi_0$ | $\rho_0$ |
| $OB_{i+2}$ | $X_1$ | $Y_1$ | $Z_1$ | $\theta_1$ | $\phi_1$ | $\rho_1$ |
| $OB_{i+3}$ | $X_2$ | $Y_2$ | $Z_2$ | $\theta_2$ | $\phi_2$ | $\rho_2$ |
| $OB_{i+4}$ | $X_3$ | $Y_3$ | $Z_3$ | $\theta_3$ | $\phi_3$ | $\rho_3$ |
| $OB_{i+5}$ | $X_4$ | $Y_4$ | $Z_4$ | $\theta_4$ | $\phi_4$ | $\rho_4$ |
| ⋮ | ⋮ | ⋮ | ⋮ | ⋮ | ⋮ | ⋮ |
| $OB_{j-2}$ | $X_{m-2}$ | $Y_{m-2}$ | $Z_{m-2}$ | $\theta_{m-2}$ | $\phi_{m-2}$ | $\rho_{m-2}$ |
| $OB_{j-1}$ | $X_{m-1}$ | $Y_{m-1}$ | $Z_{m-1}$ | $\theta_{m-1}$ | $\phi_{m-1}$ | $\rho_{m-1}$ |
| $OB_j$ | $X_m$ | $Y_m$ | $Z_m$ | $\theta_m$ | $\phi_m$ | $\rho_m$ |

FIG. 9
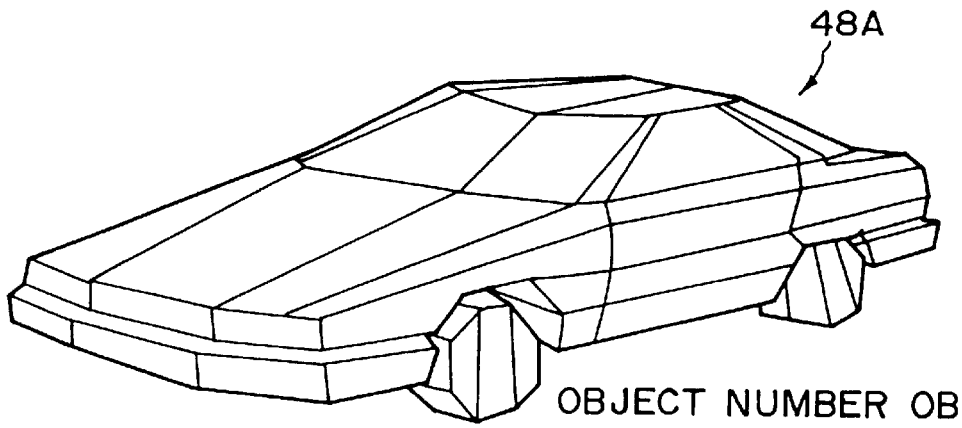
OBJECT NUMBER OBi:
APPROXIMATELY 200
TO 300 POLYGONS
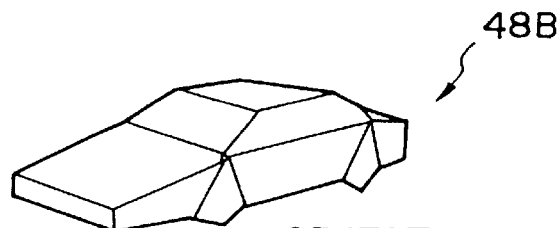
OBJECT NUMBER OBj:
APPROXIMATELY 20
TO 30 POLYGONS
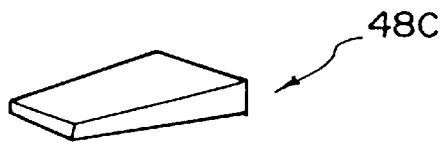
OBJECT NUMBER OBk:
6 POLYGONS

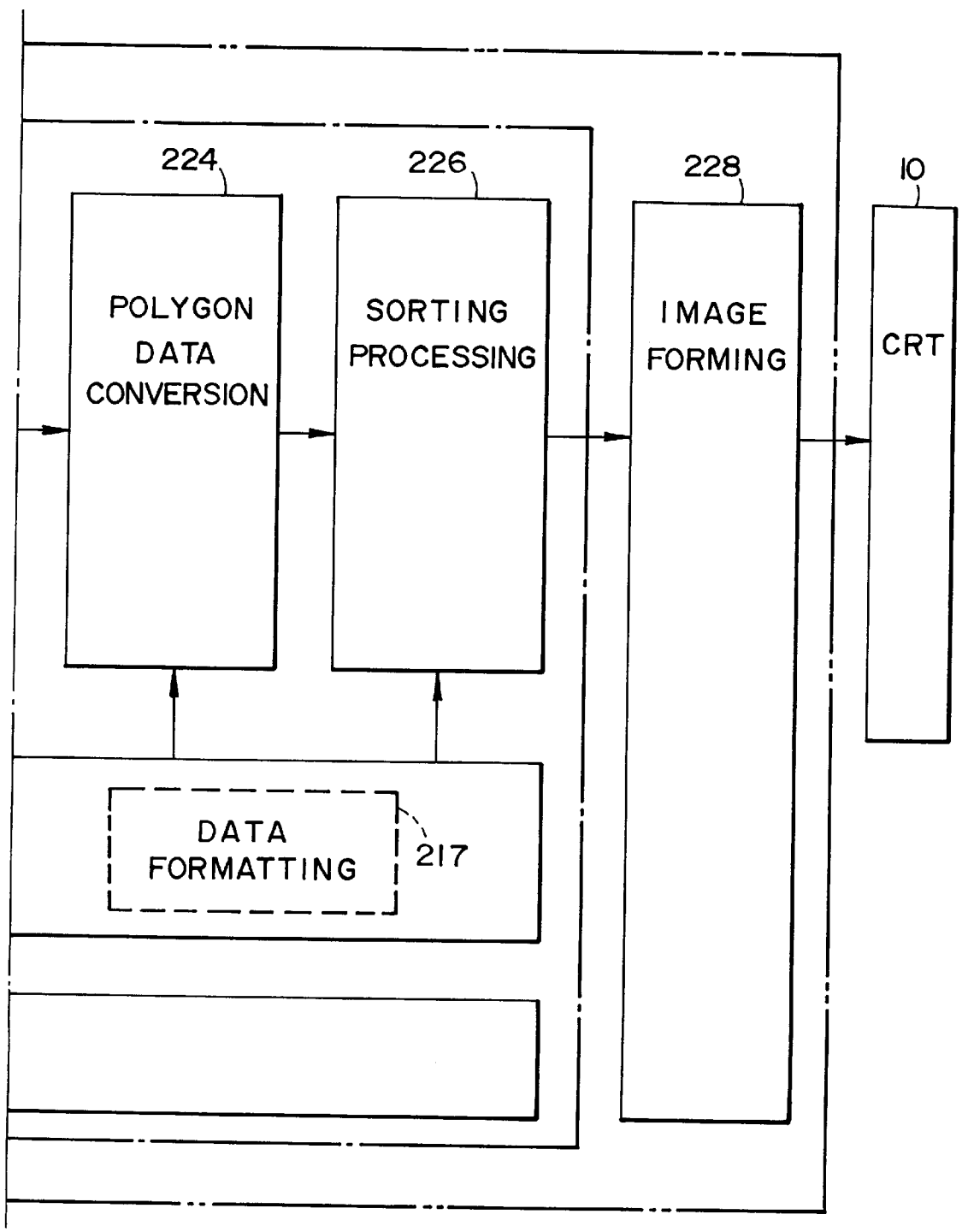
FIG. 15 (Con't)

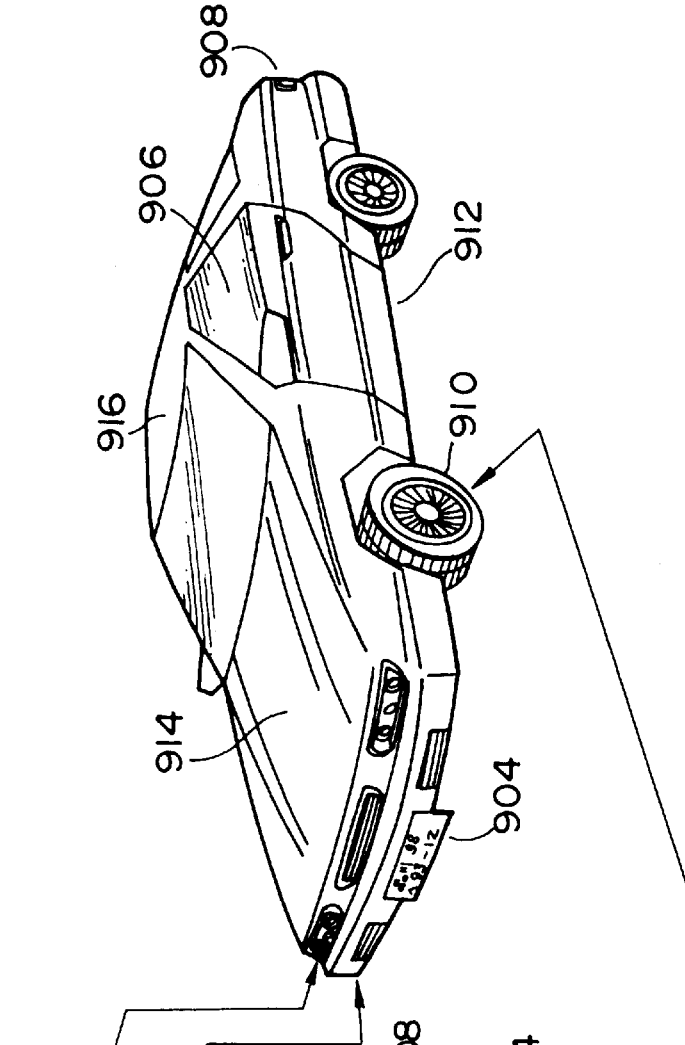
FIG. 21B (OBJECT AFTER MAPPING)
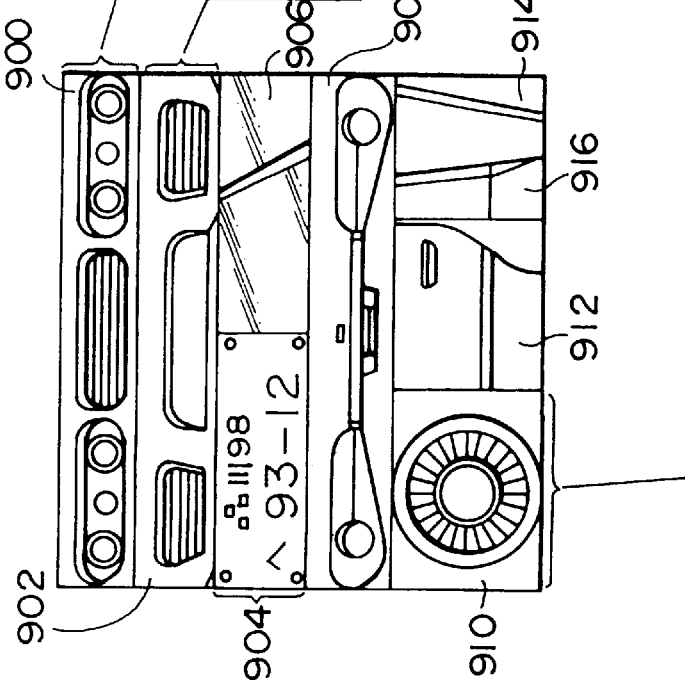
FIG. 21A (TEXTURE INFORMATION)

THREE-DIMENSIONAL IMAGE SYNTHESIS WHICH REPRESENTS IMAGES DIFFERENTLY IN MULTIPLE THREE DIMENSIONAL SPACES

TECHNICAL FIELD

This invention relates to a three-dimensional(3D) simulator apparatus and an image synthesis method that enable the simulation of a virtual 3D space.

BACKGROUND OF ART

Various types of 3D simulator apparatus that are used in applications such as 3D games or piloting simulators for aircraft or other moving bodies are known in the art. With such a 3D simulator apparatus, image information relating to a 3D object 300 shown in FIG. 25A his previously stored within the apparatus. In this case, the 3D object 300 depicts an element such as part of scenery that can be seen by a player 302 as if through a screen 306. The image information for the 3D object 300 that depicts this scenery element is displayed as a pseudo-3D image 308 on the screen 306, by perspective projection conversion on the screen 306. The player 302 specifies operations such as rotation or translation through a control Panel 304, and this apparatus performs predetermined 3D computation processing on the basis of the resultant operating signals. More specifically, computations are first performed to determine whether a change has occurred, such as a change in the viewpoint position or direction of gaze of the player 302 or a change in the position or orientation of a moving body in which the player 302 is sitting, as specified by these operating signals. Computations are then performed to determine how the image of the 3D object 300 can be seen on the screen 306, in accordance with this change such as a change in viewpoint position or direction of gaze. The above computations are performed in real time, following the actions of the player 302. This makes it possible for the player 302 to see any change in the scenery due to a change in the player's own viewpoint position or direction of gaze or a change in the position or orientation of the moving body in which the player is sitting as a pseudo-3D image in real time, to simulate the experience of a virtual 3D space.

An example of a display screen formed by a 3D simulator apparatus as described above is shown in FIG. 25B.

In such a driving game or simulator, the realism of the game or simulation can be enhanced by forming a sub-screen depicting an element such as a rear-view mirror or a side mirror on a display screen (main screen) as shown in FIG. 25B.

To further enhance the feeling of realism in the game or other simulation in this case, it is preferable that a pseudo-3D image with a degree of realism that is similar to that of the main screen is displayed on the sub-screen, such as the rear-view mirror.

However, if the pseudo-3D image is displayed on the sub-screen with the same degree of realism as on the main screen, computations for forming this sub-screen will also be necessary. Unfortunately, a simulator apparatus of this type has a limitation in that the computations for synthesizing the images should be completed within one frame, which could take 1/60 second. Therefore, if it is thought necessary to synthesize a pseudo-3D image for the sub-screen as well, as described above, problems arise in that the computations cannot be completed in time, phenomena such as drop-outs occur in the data to be displayed on the main screen, and thus the quality of the image deteriorates.

This invention was devised in order to solve the above technical problems and has as its objective the provision of a 3D simulator apparatus and an image synthesis method that can not only create an extremely realistic sub-screen on a main screen, but also ensures that the formation of this sub-screen hardly affects the image synthesis processing for the main screen.

DISCLOSURE OF THE INVENTION

In order to solve the above problems, a three-dimensional-(3D) simulator apparatus relating to a first aspect of this invention comprises: a virtual three-dimensional(3D) space computation means for computing and forming a virtual three-dimensional(3D) space by setting either position or position and orientation of a plurality of display objects configuring the virtual 3D space; and an image synthesis means for synthesizing a field-of-view image as seen from any desired viewpoint within the virtual 3D space, on the basis of computation results from the virtual 3D space computation means; wherein:

the virtual 3D space computation means comprises:

means for forming at least two virtual 3D spaces wherein either the position or position and orientation of the display objects in one of the virtual 3D spaces is the same with the other virtual 3D space, but the number of polygons configuring each of the display objects in the one virtual 3D space is different from the other virtual 3D space; and the image synthesis means comprises:

means for synthesizing a field-of-view image in one of the virtual 3D spaces wherein the number of polygons configuring each of the display objects is larger than the other virtual 3D space, as an image to be displayed on a main screen; and means for synthesizing a field-of-view image in another of the virtual 3D spaces wherein the number of polygons configuring each of the display object is smaller than the other virtual 3D space, as an image to be displayed on at least one sub-screen.

In accordance with this aspect of the invention, a plurality of virtual 3D spaces are formed in which the position or position and orientation of display objects is the same but the number of polygons configuring each of these display objects is different, such as first and second virtual 3D spaces, A display object having a smaller number of polygons than a display object in the first virtual 3D space is placed in the second virtual 3D space at the same position and orientation (the same position, if only a position is specified for the display object) as those of the display object in the first virtual 3D space. In this case, a field-of-view image in the first virtual 3D space wherein the number of polygons for each display object is larger is displayed on the main screen, and a field-of-view image in the second virtual 3D space wherein the number of polygons for each display object is smaller is displayed on the sub-screen. The above described aspect of this invention makes it possible to synthesize field-of -view images in virtual 3D spaces such that the formation of the sub-screen is similar to the formation of the main screen, without greatly deteriorating the quality of the image displayed on the main screen, so that both the main screen and the sub-screen can be displayed in a highly realistic manner with in a limited computation capability. This makes it possible to provide a 3D simulator apparatus that can form high-quality images in real time. In addition, an extremely realistic image such as that as seen through a rear-view mirror, a side mirror, or from above the moving body can be displayed on the main screen. Note that computations for inverseing this field-of-view image horizontally will be required if the sub-screen is used to show a rear-view or side mirror, to obtain a rearward-facing field-of-view image as seen by the operator.

A second aspect of this invention further comprises:

texture computation means for performing computations for implementing texture with respect to polygons configuring the display objects; and texture information storage means for storing information on the texture to be implemented by the texture computation means; wherein:

the texture computation means comprises:

means for using texture information stored in the texture information storage means in common, for at least a part of the display objects in different virtual 3D spaces that have either the same position or the same position and orientation.

In accordance with this aspect of the invention, it is no longer necessary to provide separate texture information for each of the display objects in different virtual 3D spaces, so that the storage capacity required of the texture information storage means can be reduced. This makes it possible to design a less expensive apparatus. Moreover, since display objects for the sub-screen are also subjected to texture mapping by this aspect of the invention, using common texture information, the realism of the image displayed on the sub-screen can be enhanced so that it is similar to that of the main screen. This enables the formation of visual effects that are not available in the prior art, which enhances the interest of the game. Note that it is not necessary with this invention to use texture information in common for all of these display objects; separate texture information could be provided for objects where use of common information would create a great deal of distortion.

A 3D simulator apparatus in accordance with a third aspect of this invention comprises:

virtual three-dimensional(3D) space computation means for computing and forming a virtual three-dimensional (3D) space by setting display object information that comprises either an object number and position information or an object number and position and orientation information for each of a plurality of display objects configuring the virtual 3D space;

image information storage means for storing image information for an object specified by the object number; and image synthesis means for synthesizing a field-of-view image as seen from any desired viewpoint within the virtual 3D space, on the basis of the display object information and the image information read out from the image information storage means according to the object number; wherein:

the virtual 3D space computation means comprises:

means for forming a plurality of groups of display object information having either the same position information or the same position and orientation information but different object numbers;

the image information storage means stores the image information which has different numbers of polygons configuring each object specified by the different object numbers; and the image synthesis means comprises:

means for synthesizing a field-of-view image to be displayed on a main screen, on the basis of the image information for an object with a larger number of polygons; and means for synthesizing a field-of-view image to be displayed on at least one sub-screen, on the basis of the image information for an object with a smaller number of polygons.

In accordance with this aspect of the invention, a plurality of groups of display object information having the same position information but different object numbers is formed, such as first and second display object information. Image information is formed for an object specified by an object number in the first display object information, in such a manner that, for example, the number of polygons is larger. Conversely, image information is formed for an object specified by an object number in the second display object information, in such a manner that, for example, the number of polygons is smaller. A field-of-view image to be displayed on the main screen is synthesized on the basis of the image information read out by the object number in the first display object information and a field-of-view image to be displayed on the sub-screen is synthesized on the basis of the image information read out by the object number in the second display object information. This makes it possible to present a main screen of objects configured of many polygons as well to as a sub-screen of objects configured of few polygons. Thus the number of polygons required for forming the sub-screen can be reduced without greatly deteriorating the quality of the image displayed on the main screen, making it possible to support real-time image processing, Moreover, since a field-of-view image from any desired viewpoint in the virtual 3D space is synthesized by using display object information and object image information in the same manner for the formation of both the sub-screen and the main screen, the realism of the image displayed on the sub-screen can be enhanced.

In accordance with a fourth aspect of this invention, the image information storage means stores the image information for a plurality of objects with different numbers of polygons;

the image synthesis means comprises:

means for synthesizing a field-of-view image on the basis of the image information for objects that are selected according to a given selection range from within the plurality of objects; and the selection range of the objects for synthesizing the field-of-view image on the main screen is a selection range comprising more objects with larger numbers of polygons than the selection range of the objects for synthesizing the field-of-view image for the sub-screen.

With this aspect of the invention, image information for a plurality of objects that have position and other information in common but different numbers of polygons is provided, such as image information for first, second, and third objects. In this case, assume that the first object has the largest number of polygons and the third object has the smallest number of polygons. When the field-of-view image for the main screen is synthesized, this field-of-view image is synthesized on the basis of this image information for the first, second, and third objects. On the other hand, when the field-of-view image for the sub-screen is synthesized, only the second and third objects, for example, are selected from the first, second, and third objects, so that this field-of-view image is synthesized on the basis of the image information for the second and third objects. This makes it possible to provide processing whereby far-distance, middle-distance, and near-distance objects are used on the main screen depending on the distance therefrom, for example, and middle-distance and near-distance objects alone are used on the sub-screen depending on the distance therefrom. Thus the number of polygons required for forming the sub-screen can be reduced overall to less than the number of polygons required for forming the main screen. As a result, a realistic image can be displayed on the sub-screen without greatly affecting the image synthesis processing for the main screen.

In accordance with a fifth aspect of this invention, the virtual 3D space computation means comprises:

the virtual 3D space computation means comprises:
means for omitting the formation of the plurality of groups of display object information for some of the display objects; whereby:
display on the sub-screen is omitted for some of the display objects that are displayed on the main screen.

With this aspect of the invention, objects such as buildings displayed on the main screen can be omitted from the sub-screen, for example. Since the size of the sub-screen is normally less than that of the main screen, the player is not likely to notice when some objects are omitted in this manner. This omission of the display of some objects from the sub-screen also makes it possible to further reduce the number of polygons required for forming the sub-screen.

A sixth aspect of this invention further comprises means for dividing a map configuring a virtual 3D space into a predetermined number of segments and displaying the map by placing map objects in a segmented map; wherein:

the number of segments of a map displayed on the main screen is greater than the number of segments of a map displayed on the sub-screen.

This aspect of the invention makes it possible to display a map that is expressed in detail on the main screen, and also display a map that is expressed in a simplified manner on the sub-screen. As a result, the number of polygons required for forming the sub-screen can be reduced, and a realistic image can be displayed on the sub-screen without greatly affecting the image synthesis processing for the main screen.

A seventh aspect of this invention further comprises texture computation means for performing computations for implementing texture with respect to polygons configuring objects; and texture information storage means for storing information on the texture implemented by the texture computation means; wherein:
the image information storage means stores vertex texture to coordinates for specifying texture information in the texture information storage means as part of the image information; and
the texture computation means comprises:
means for using in common some of the vertex texture coordinates used for implementing texture on polygons of objects to be displayed on the main screen, during implementation of texture on polygons of objects to be displayed on the sub-screen.

In accordance with this aspect of the invention, it is not necessary to provide separate texture information for the main screen and the sub-screen, so that the storage capacity required of the texture information storage means can be reduced. This makes it possible to design a less expensive apparatus. Moreover, since display objects for the sub-screen are also subjected to texture mapping by this aspect of the invention, the realism of the image displayed on the sub-screen can be enhanced so that it is similar to that of the main screen. Note that this aspect of the invention makes it possible to use vertex brightness information in common, in addition to vertex texture coordinates.

BRIEF DESCRIPTION OF DRAWINGS

FIG. 6 is a schematic diagram used for illustrating display object information that is stored in the display object information storage section;

FIGS. 8A and 8B are schematic diagrams used for illustrating a plurality of groups of display object information with the same position and orientation information but different object numbers;

FIG. 9 shows a plurality of types of racing car object having different numbers of polygons;

FIGS. 21A and 21B pictorially illustrate the implementation of texture mapping on a racing car object;

BEST MODE FOR CARRYING OUT THE INVENTION

1. Outline of Game

A typical 3D game enabled by the 3D simulator apparatus of this invention will first be briefly described.

Figure 2:
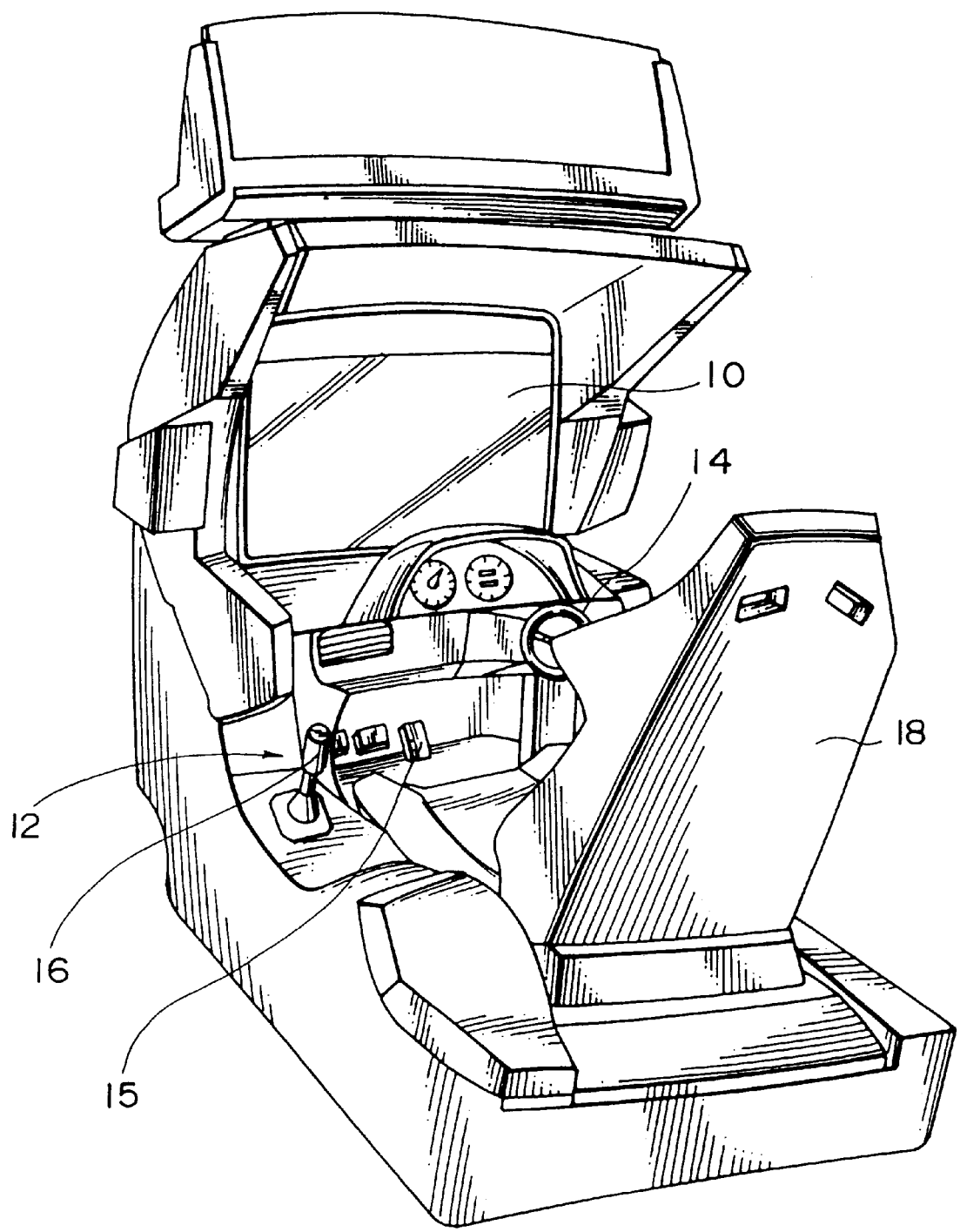
FIG. 2 is a schematic view of an example of the exterior of this 3D simulator apparatus.

The 3D game enabled by this 3D simulator apparatus is a racing-car game in which a moving body, such as the player's racing car, runs along a track formed on a map, so that the player can compete against other racing cars operated by other players or computer cars operated by a computer. An example of the exterior of such a 3D simulator apparatus is shown in FIG. 2. The 3D simulator apparatus is configured in the same manner as the driver's seat of a real-life racing car, as shown in this figure. In this game, the player sits in a seat 18 and drives this imaginary racing car by operating controls such as a steering wheel 14, accelerator pedal 15, and shift lever 16 provided in a control section 12, while viewing a game scene (a pseudo-3D image of the surroundings as seen from the driver's seat of the racing car) that appears on a CRT (display) 10.

Figure 3:
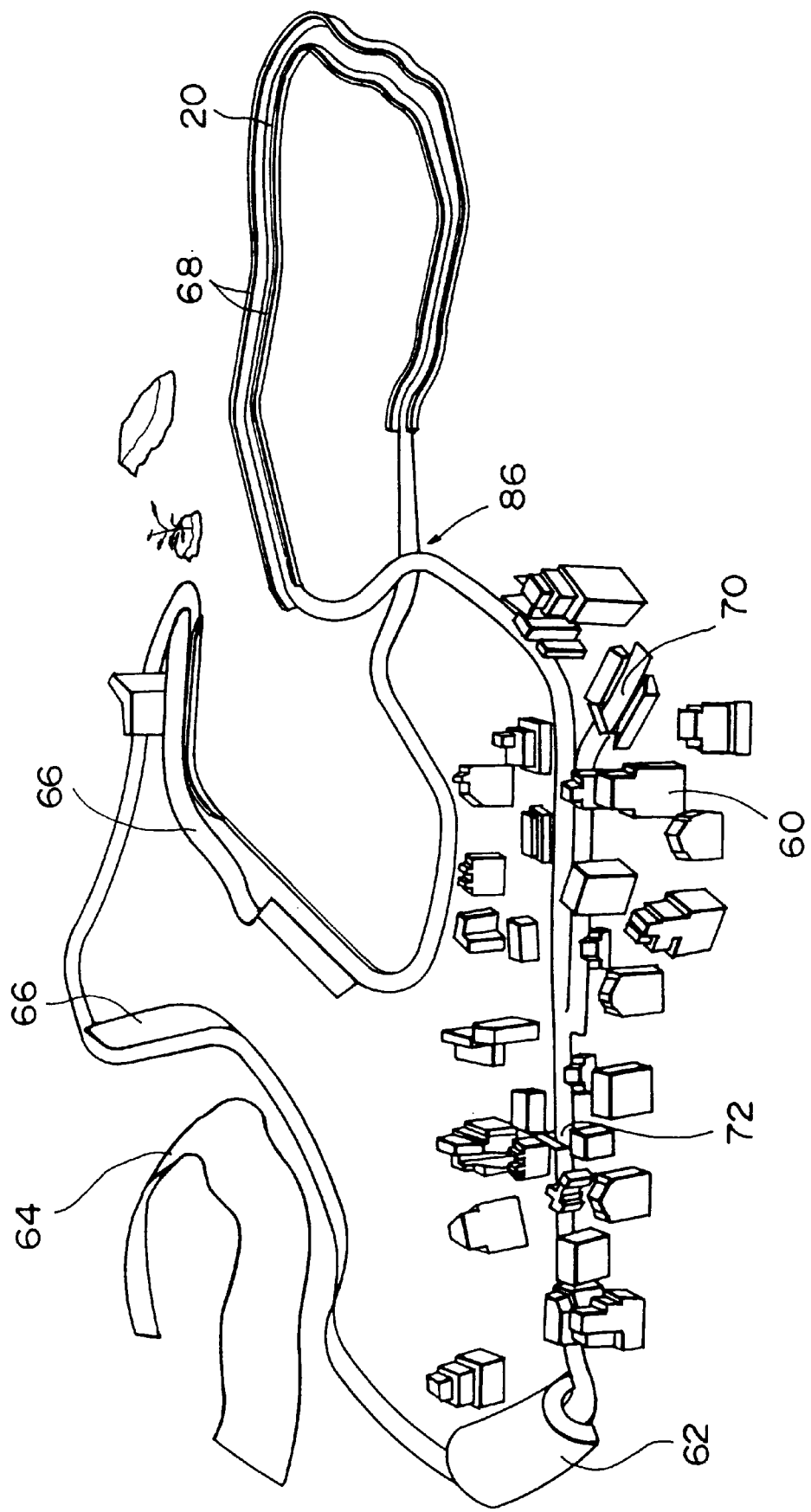
FIG. 3 is a schematic view of an example of a virtual 3D space.

An example of a virtual 3D space formed by this 3D game is shown in FIG. 3. This figure shows how a track 20 that is formed in a three-dimensional fashion is laid out within the virtual 3D space of the 3D game. Various 3D objects such as buildings 60, a tunnel 62, mountain 64, cliffs 66, and walls 68 are also laid out around the periphery of this track 20. The player operates the racing car while viewing the CRT 10 on which is projected this track and other 3D objects. The player starts from a starting line 70, drives around the track 20 a predetermined number of times until he or she reaches a finishing line, and thus the player's ranking is determined.

Figure 4:
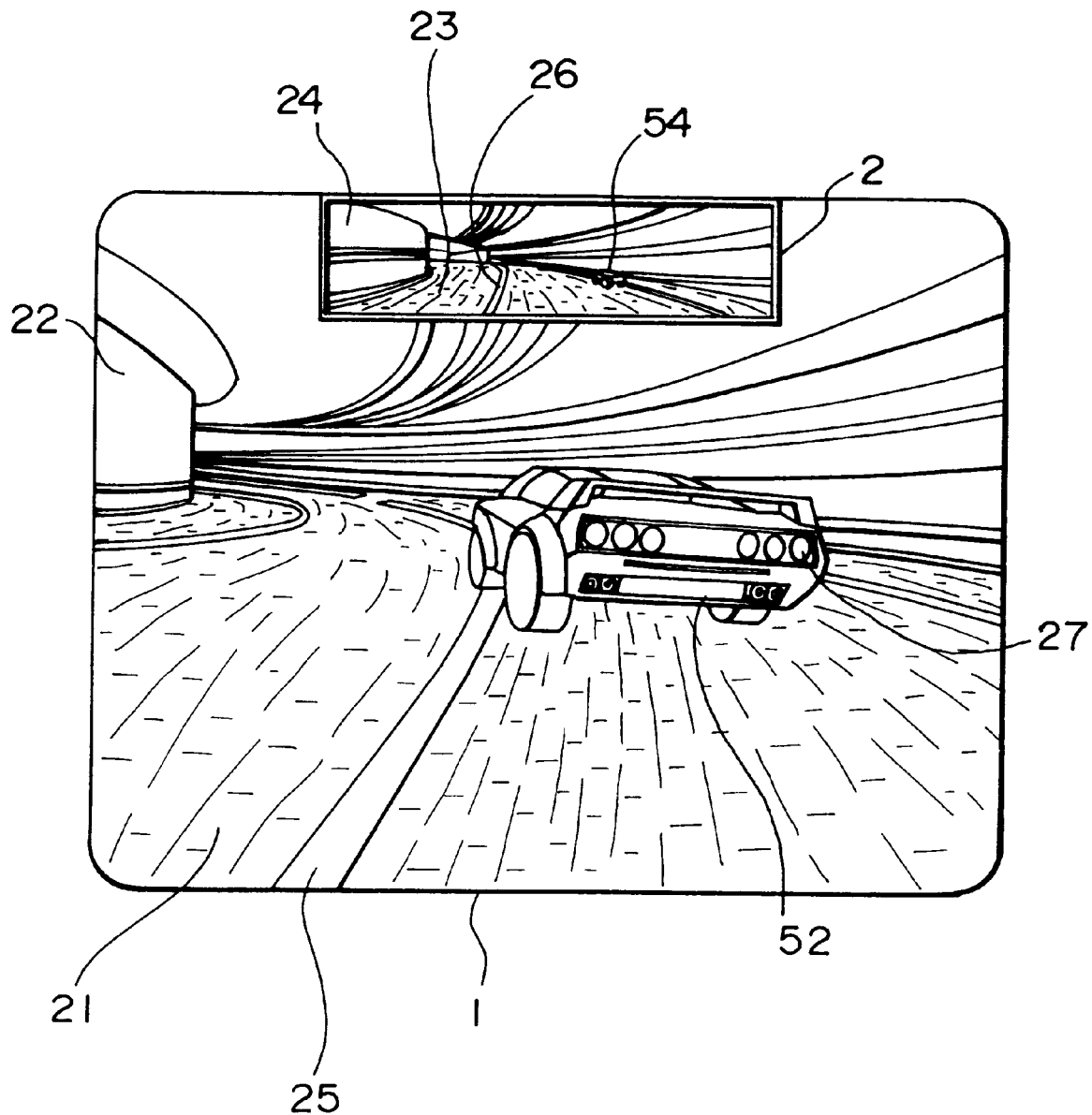
FIG. 4 is a schematic view of a game scene (pseudo-3D image) synthesized by this 3D simulator apparatus.

An example of the game scene projected on the CRT 10 during this 3D game is shown in FIG. 4. A main screen 1 in FIG. 4 displays another racing car, such as another player's racing car 52, and the player can compete against the other player's racing car 52 while watching this main screen 1. As shown in FIG. 4, elements such as a road surface 21 and tunnel walls 22 are also displayed on the main screen, in addition to the other player's racing car 52. A depiction of a rear-view mirror (sub-screen) 2 is also displayed onto the main screen 1, and the player can check whether a computer-operated car 54 is chasing from behind, by looking in this rear-view mirror 2. These extra details enable a huge increase in reality and fun of the game. A road surface 23 and walls 24 are displayed on the rear-view mirror 2, in the same manner as on the main screen. An asphalt-like pattern is applied to the road surface 23 that is displayed on the rear-view mirror 2, similar to that projected on the road surface 21 in the main screen 1, and elements such as a center-line 26 are drawn thereon. Thus the 3D game ensures that the image inversed in the rear-view mirror 2 is just as realistic as the main screen 1. Further details such as tail-lamps are drawn on the other player's racing car 52 on the main screen 1, as shown in FIG. 4, and the other player's racing car 52 itself is accurately drawn so that it appears to be close to the real thing. In contrast, the computer-operated car 54 displayed on the rear-view mirror 2 is drawn in a more abbreviated form than the other player's racing car 52.

With this embodiment, a virtual 3D space for drawing the main screen 1 and a virtual 3D space for drawing the rear-view mirror (the sub-screen 2) are provided separately, as will be described later. This makes it possible to project the image of the rear-view mirror 2 of FIG. 4 with the same degree of realism as that of the main screen 1. The display area of the rear-view mirror 2 is smaller than that of the main screen 1, so it is possible to reduce the degree of detail of the display objects to a certain extent without the player noticing. In this case, the number of polygons configuring each of the display objects in the rear-view mirror 2 is reduced to less than the number of polygons configuring each of the display objects in the main screen 1. This makes it possible to reduce the total number of polygons that have to be subjected to computation processing, while preserving the feeling of realism to a certain extent, and is also effective in preventing problems such as the dropping of image data from the main screen 1.

Note that, although the above description concerned a one- or two-player game, this invention is not limited thereto and can equally well be applied to a multi-player type of game for three or more players.

2. Description of Entire Apparatus

Figure 1:
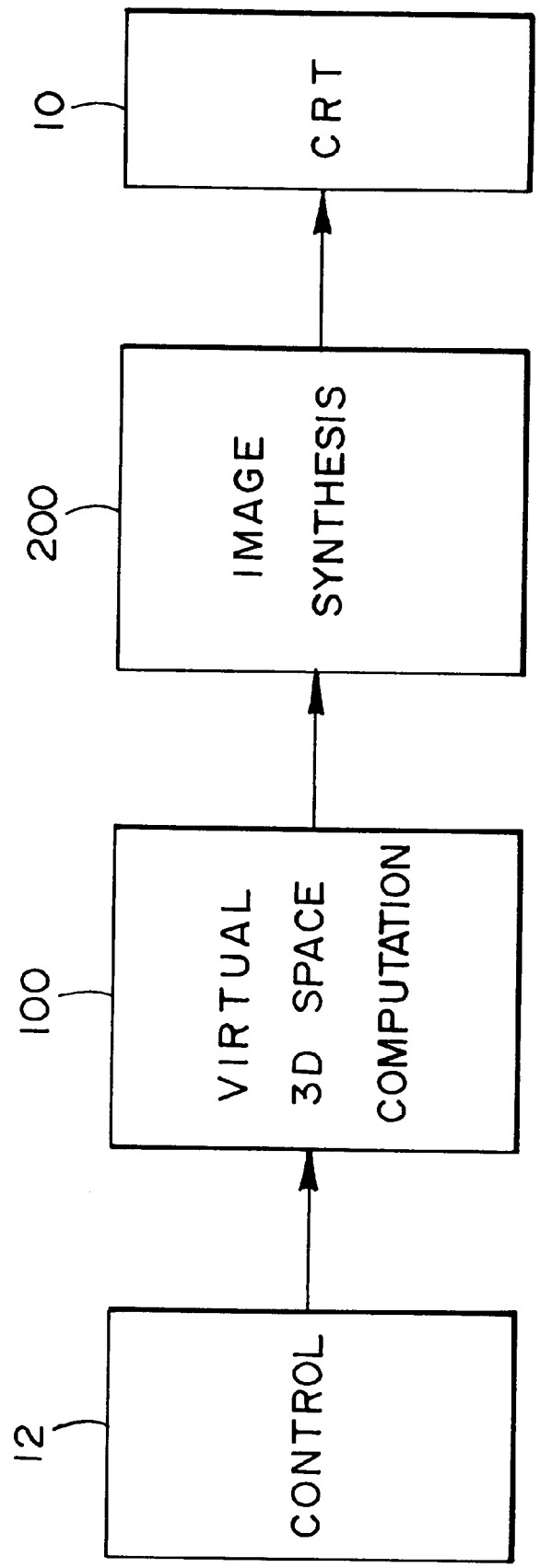
FIG. 1 is a block diagram of an example of an embodiment in accordance with this invention.

A block diagram of an embodiment of the 3D simulator apparatus to which this invention is applied is shown in FIG. 1.

This 3D simulator apparatus comprises a control section 12 to which the player inputs operating signals, a virtual 3D space computation section 100 that performs computations for setting a virtual 3D space according to a predetermined games program, an image synthesis section 200 that forms a pseudo-3D image as if seen from the viewpoint of the player, and the CRT (display) 10 that outputs this pseudo-3D image.

When this 3D simulator apparatus is applied to a racing car game, for example, the control section 12 is connected to controls such as the steering wheel 14 and accelerator pedal 15 for driving the racing car, and operating signals are input thereby.

The virtual 3D space computation section 100 performs computations to set either the position alone or the position and orientation of the plurality of display objects within the virtual 3D space shown in FIG. 3, such as the track 20, buildings 60, tunnel 62, mountain 64, cliffs 66, and walls 68, the player's own racing car, other players' racing cars, and computer-operated cars. These computations are based on factors such as operating signals from the control section 12 and map information that has previously been stored.

The image synthesis section 200 performs computations to form a field-of-view image as seen from any desired viewpoint within the virtual 3D space, on the basis of the computation results from the virtual 3D space computation section 100. The thus formed field-of-view image is output by the CRT 10.

With this embodiment, first and second virtual 3D spaces are formed by the computations of the virtual 3D space computation section 100. These spaces have different numbers of polygons that configure display objects having the same position or position and orientation. In other words, two virtual 3D spaces are provided for the scene shown in FIG. 3. Note that there is a different number of polygons configuring the display objects in these two virtual 3D spaces, such that the first virtual 3D space is set to have a larger number of polygons in each display object. A field-of-view image of the first virtual 3D space is formed by the image synthesis section 200 as the image to be displayed on the main screen. Similarly, a field-of-view image of the second virtual 3D space is formed as the image to be displayed on the sub-screen. This makes it possible to form the game scene shown in FIG. 4. Note that the description that follows concerns the case in which the sub-screen is used as the rear-view mirror 2. In this application, a field-of-view image is formed from the first virtual 3D space as if seen by a forward-facing direction of gaze with the viewpoint position being at the position of the player's car. In contrast thereto, a field-of-view image is formed from the second virtual 3D space as if seen by a rearward-facing direction of gaze. The field-of-view image computed in the second virtual 3D space is also subjected to a horizontal (right-and-left) inversion, before being displayed on the rear-view mirror 2.

Figure 15:
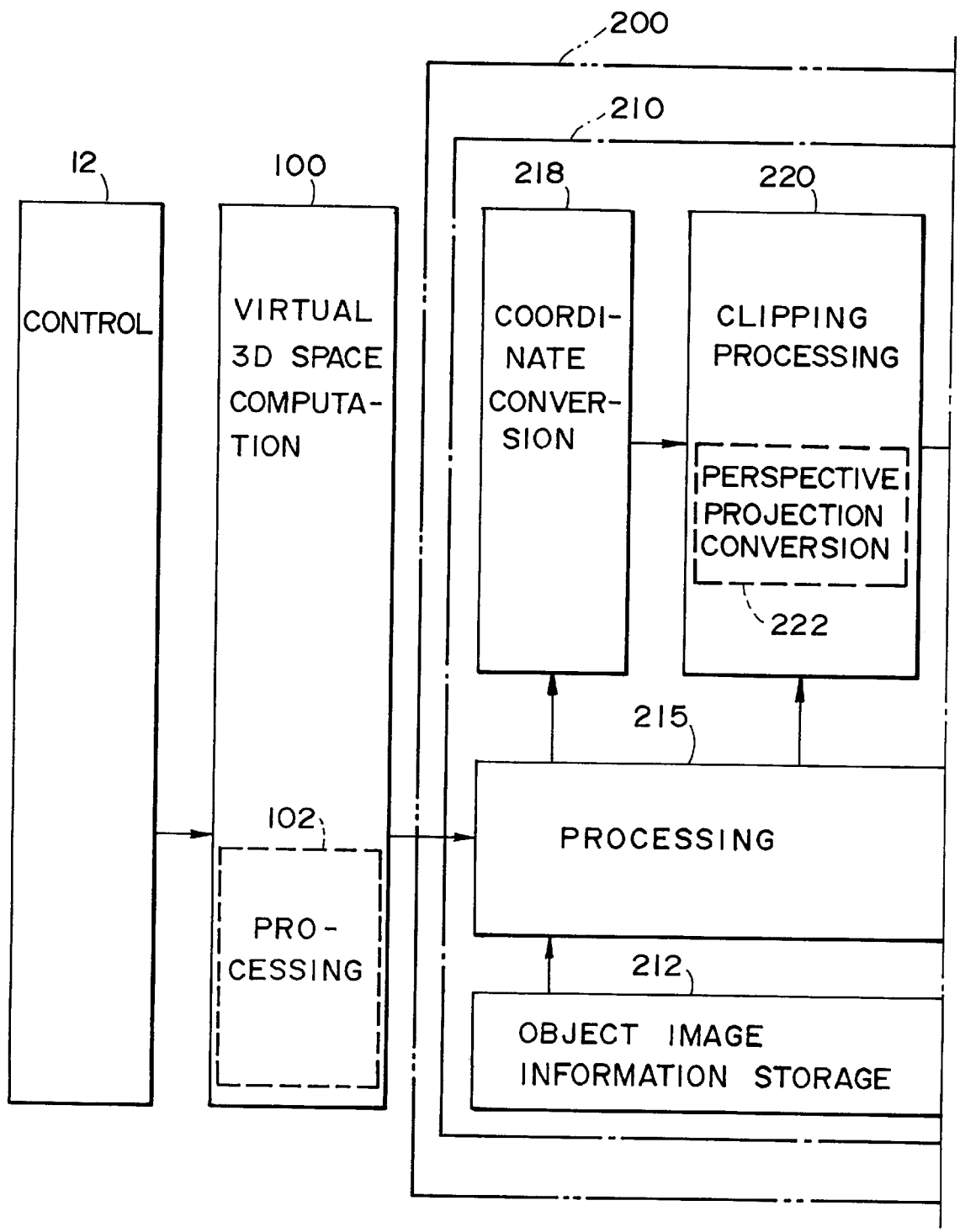
FIG. 15 is a block diagram of an example of an image supply section.
Figure 18:
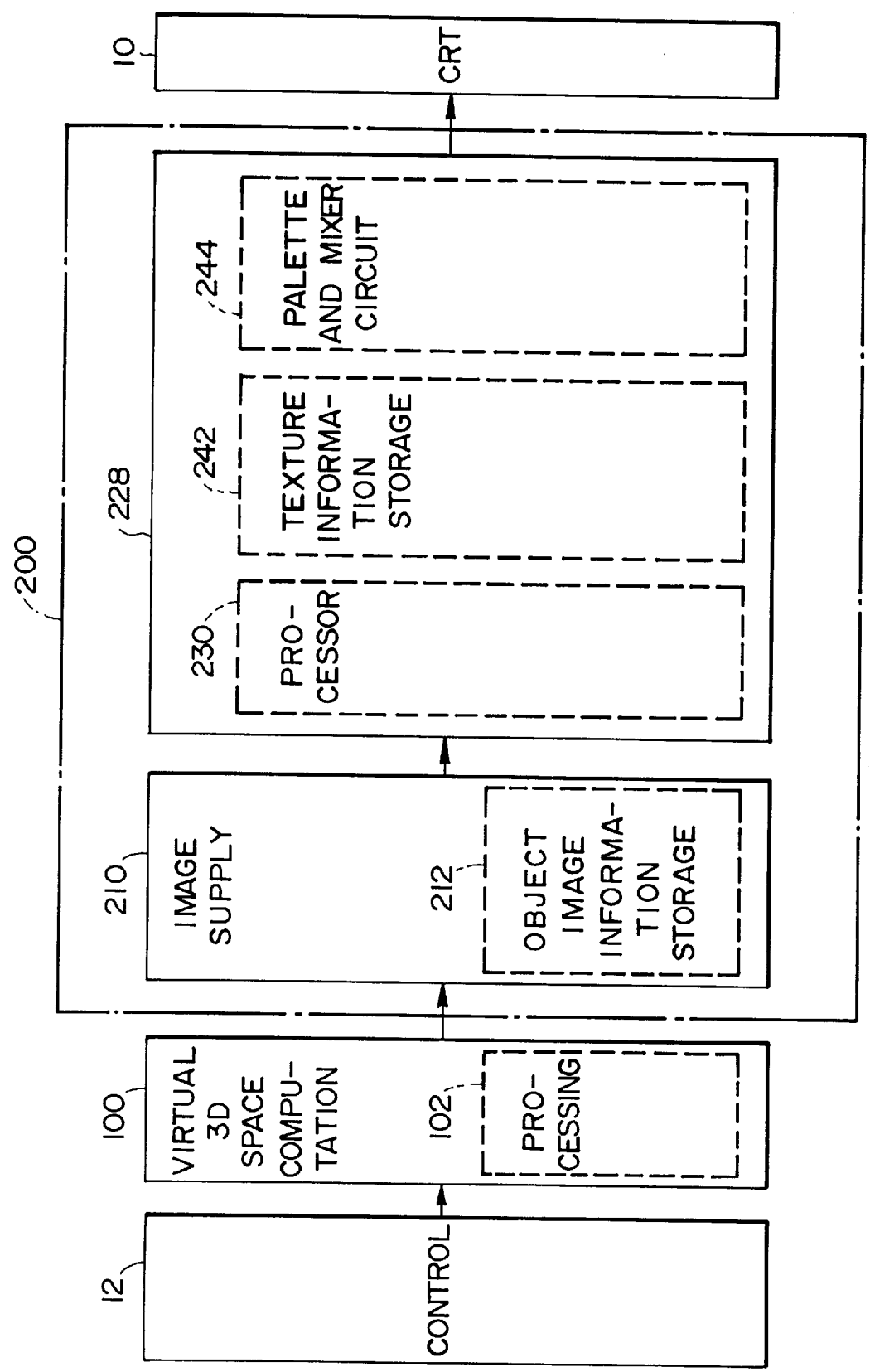
FIG. 18 is a block diagram of an example of an image synthesis section.

Specific configurations of the virtual 3D space computation section 100 and image synthesis section 200 will now be described. A block diagram of an example of the virtual 3D space computation section 100 is shown in FIG. 5, a block diagram of an example of an image supply section 210 within the image synthesis section 200 is shown in FIG. 15, and a block diagram of an example of an image forming section 228 therein is shown in FIG. 18.

3. Description of Virtual 3D Space Computation Section

Figure 5:
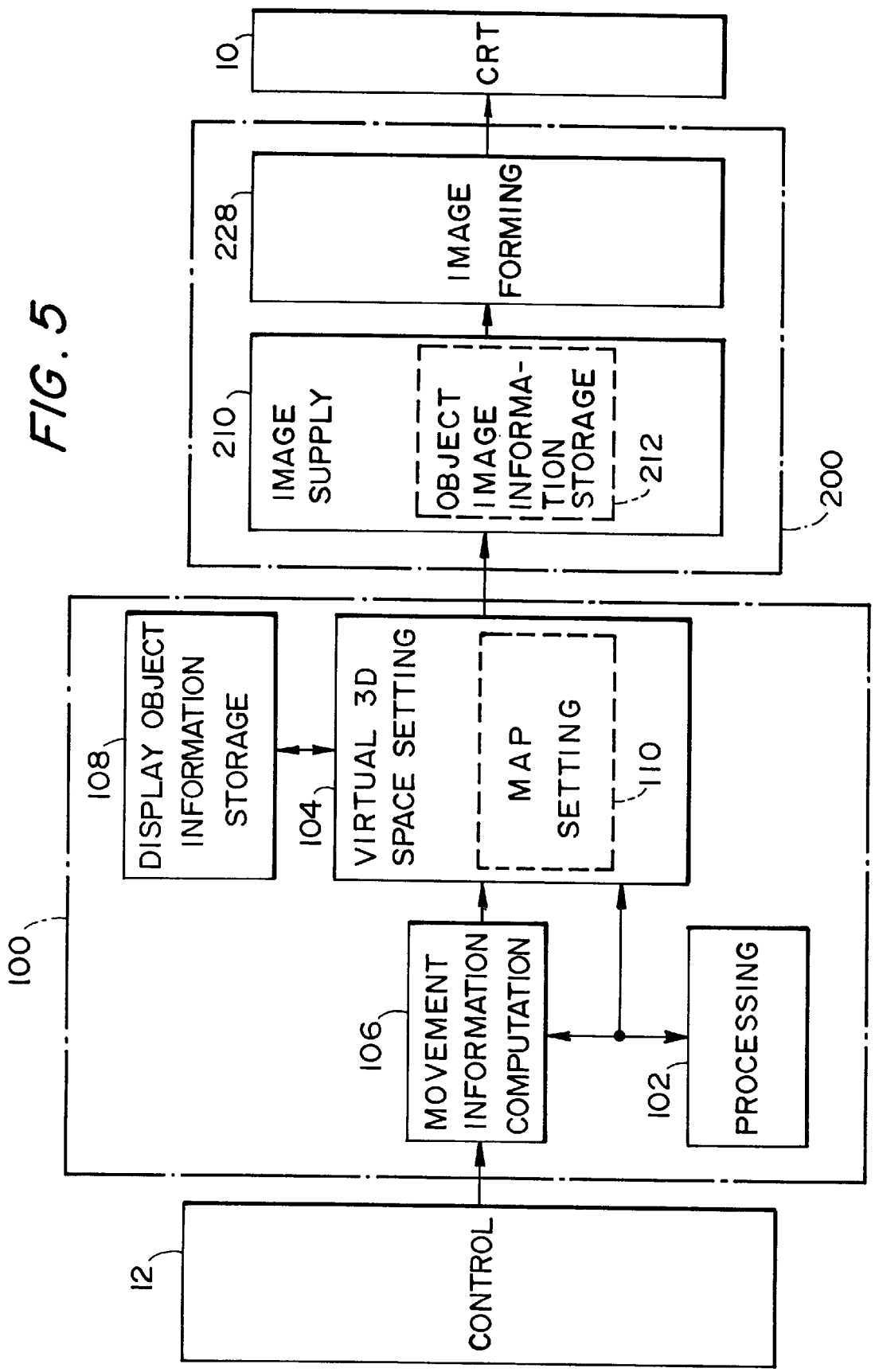
FIG. 5 is a block diagram of an example of a virtual 3D space computation section.

As shown in FIG. 5, the virtual 3D space computation section 100 comprises a processing section 102, a virtual 3D space setting section 104, a movement information computation section 106, and a display object information storage section (object information storage section) 108.

In this embodiment, control of the entire 3D simulator apparatus is performed by the processing section 102. A predetermined games program is stored within a memory section that is provided within the processing section 102. The virtual 3D space computation section 100 is designed to compute the setting of virtual 3D spaces in accordance with this games program and operating signals from the control section 12.

Movement information for the racing car is computed by the movement information computation section 106 in accordance with operating signals from the control section 12 and instructions from the processing section 102.

Position and orientation information for each display object that configures the virtual 3D space is stored in the display object information storage section 108, together with an object number referring to the object that is to be displayed at that position (this stored position and orientation information and the object number is hereinafter called display object information (object information)). An example of the display object information stored in the display object information storage section 108 is shown in FIG. 6. The relationship between position and orientation information (Xm, Ym, Zm, θm, Φm, ρm) included within this display object information and an absolute coordinate system (Xw, Yw, Zw) is shown in FIG. 7.

Figure 7:
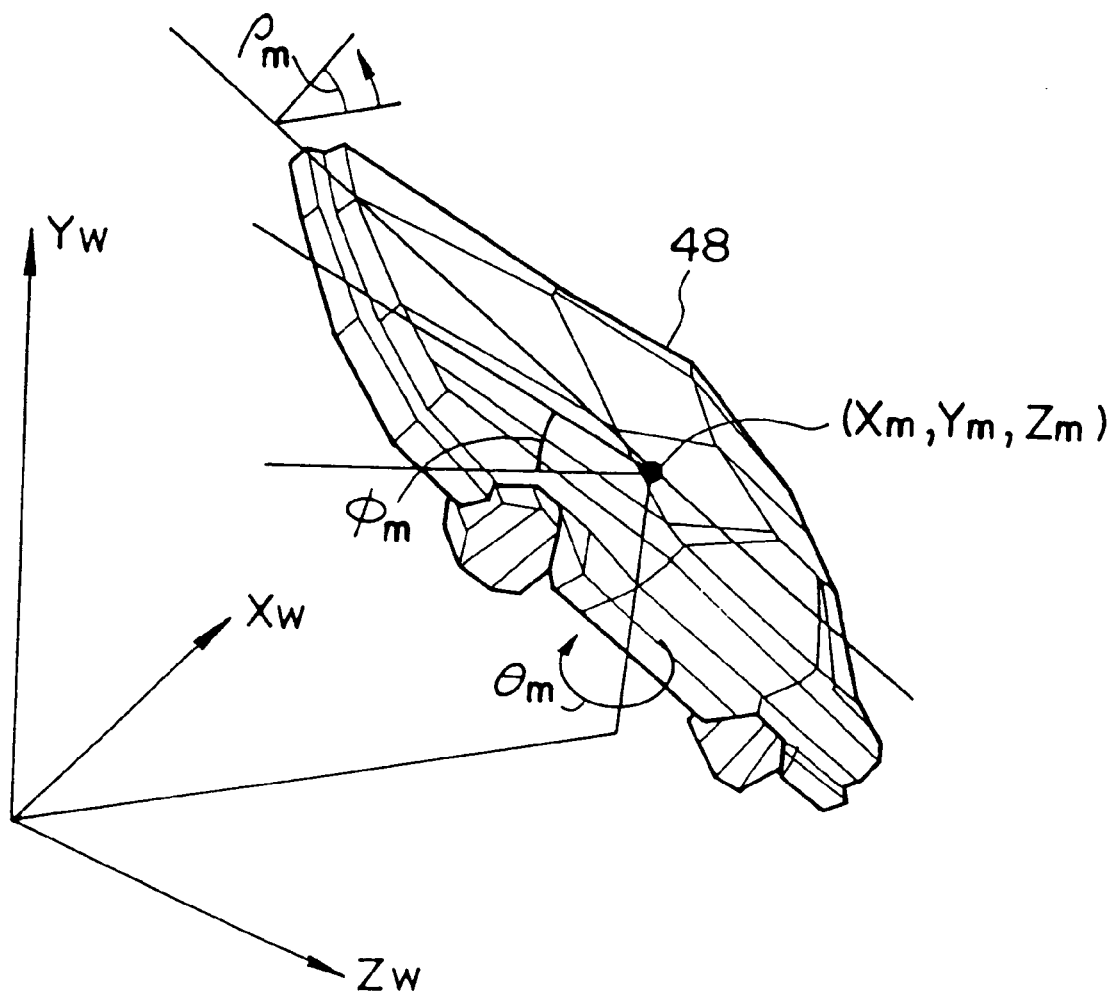
FIG. 7 is a schematic view used for illustrating display object information that is set for each object.

In this embodiment, an object is a moving body object depicting a racing car or a map object depicting an immobile thing such as a track, and each object is expressed as a collection of polygons, as shown in FIG. 7.

The display object information stored in the display object information storage section 108 is read out by the virtual 3D space setting section 104. At that point, display object information for the frame before the current frame is stored in the display object information storage section 108. Display object information (position and orientation information) for that particular frame is obtained by the virtual 3D space setting section 104 on the basis of the thus read-out display object information and movement information computed by the movement information computation section 106.

In this manner, display object information for all the display objects that configure the virtual 3D space for that frame is set by the virtual 3D space setting section 104.

Note that the above described updating of the display object information for each frame as the game progresses is done for display objects that are moving bodys such as racing cars; the display object information for the map normally remains constant. However, if the map depicts features such as meteors in an outer-space game, it may be necessary to change more information such as orientation information as the game progresses. Some kinds of map may have position information but no orientation information. In addition, if the map is divided into a plurality of map segments and the configuration is such that map objects are set for these map segments, as will be described later, a map setting section 110 is provided in the virtual 3D space setting section 104 of FIG. 5 and the map setting is performed by this map setting section 110.

With this embodiment, the predetermined computation processing performed by the virtual 3D space setting section 104 takes the display object information of FIG. 6 and forms a plurality of groups of display object information wherein the position and orientation information is the same (or the position information is the same, if the display object information has no orientation information) but the object numbers are different. More specifically, the virtual 3D space setting section 104 reads out the display object information that is stored in the display object information storage section 108, as shown in FIG. 6, and forms a plurality of groups of display object information by changing only the object number. The thus formed plurality of groups of display object information is output to the image synthesis section 200.

An example of the plurality of groups of display object information formed in this manner is shown in FIGS. 8A and 8B. The display object information shown in FIG. 8A is the same as that of FIG. 6. In contrast, the display object information shown in FIG. 8B differs from that of FIG. 8A only in the object numbers of the display object information. For example, an object OB0 of FIG. 8A and an object OBi+1 of FIG. 8B have the same position and orientation information (X0, Y0, Z0, θ0, Φ0, ρ0) but different object numbers. This formation of display object information with the same position and orientation information but different object numbers makes it possible to present racing cars 48A, 48B, and 48C that have different numbers of polygons, as shown in FIG. 9. In other words, the racing cars 48A, 48B, and 48C have the same position and orientation information but different object to numbers OBi, OBj, and OBk. Object image information (the number of polygons and other polygon information are expressed by this object image information) for the racing cars 48A, 48B, and 48C is stored in an object image information storage section 212 shown in FIG. 5, and this object image information can be read out therefrom by specifying an object number. This means that each of the racing cars 48A, 48B, and 48C with different numbers of polygons as shown in FIG. 9 can be read out by specifying different object numbers. Each of these racing cars 48A, 48B, and 48C is placed with the same position and orientation in the first and second virtual 3D spaces. Thus two virtual 3D spaces containing display objects that have different numbers of polygons can be implemented, by placing objects that have the same position and orientation, but different numbers of polygons, to configure the virtual 3D spaces.

Figure 10:
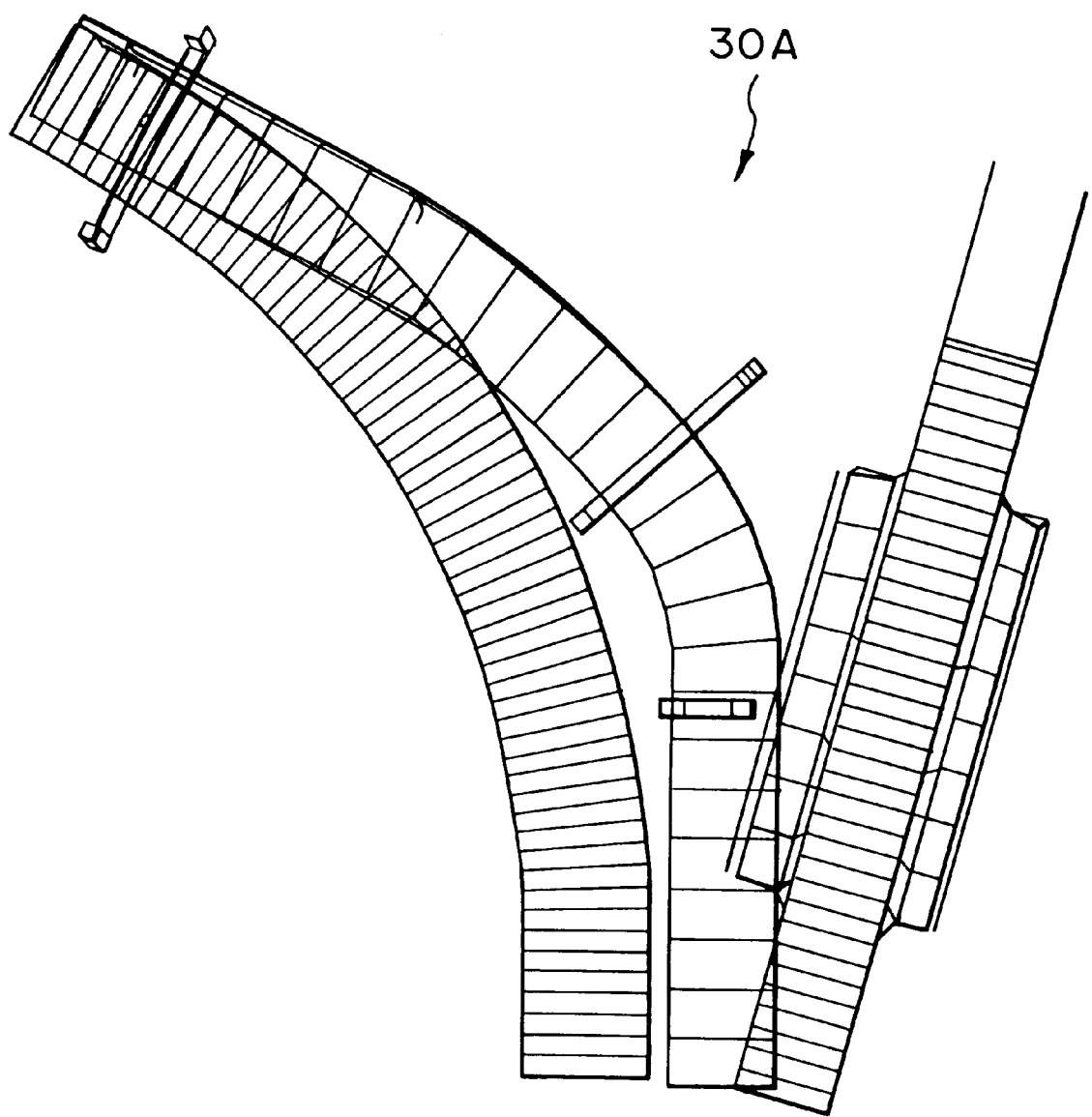
FIG. 10 shows an example of a track object configured of a large number of polygons.
Figure 11:
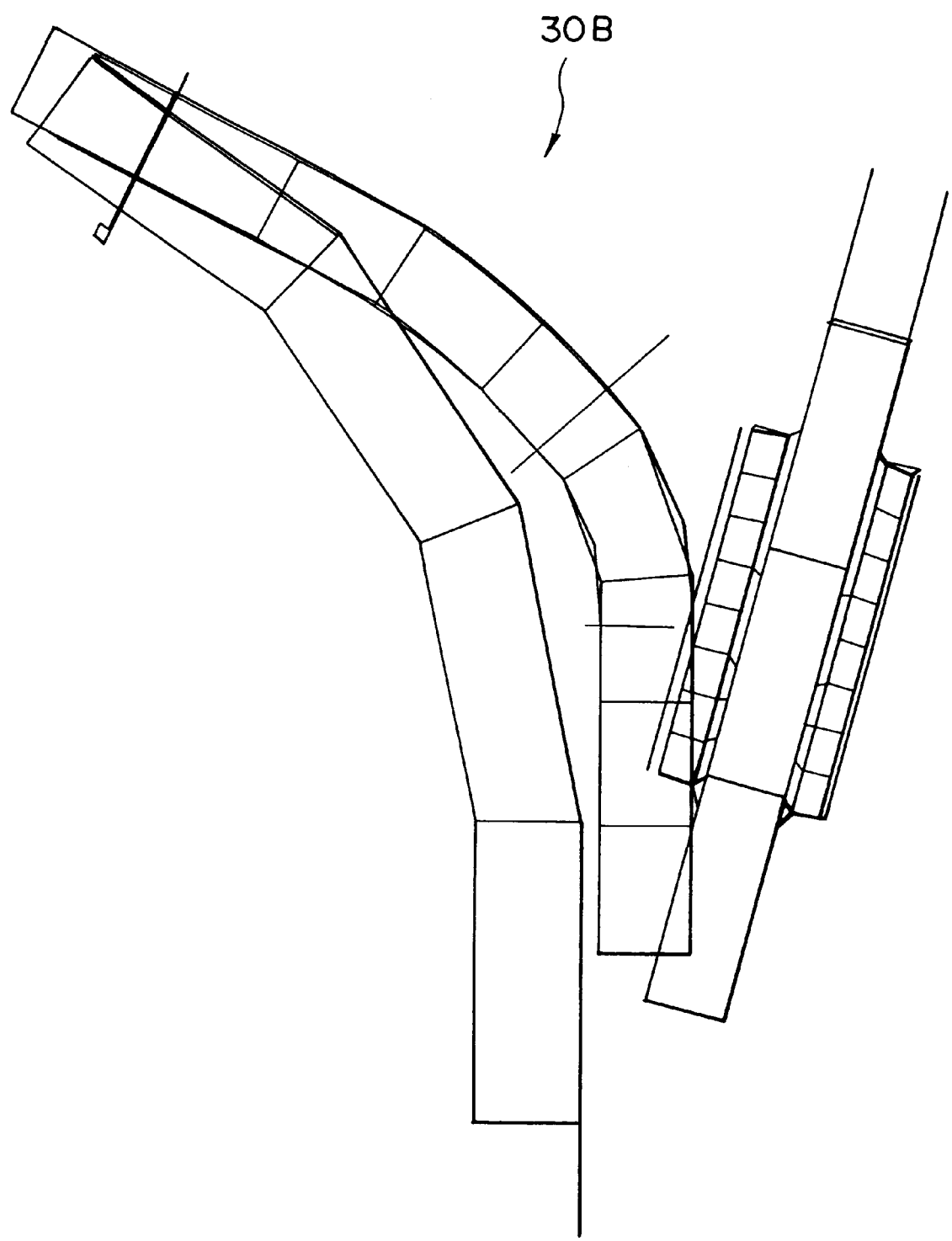
FIG. 11 shows an example of a track object configured of a small number of polygons.

Track objects 30A and 30B (map objects) with different numbers of polygons are shown in FIGS. 10 and 11. The track object 30A is drawn in detail with a larger number of polygons, whereas the track object 30B is drawn more simply, with fewer polygons. The track 20 shown in FIG. 3 is configured of a series of such track objects. Two tracks are provided by this embodiment: one configured of track objects with a large number of polygons and another configured of track objects with a small number of polygons. In the same manner as with the racing cars described above, a plurality of groups of display object information relating to the track (map) can be formed by simply changing the object number within the display object information of FIG. 6.

As described above, two virtual 3D spaces can be expressed by forming a plurality of groups of display object information that can be used to place objects that have different numbers of polygons but have the same position and orientation. A field-of-view image of the first virtual 3D space configured of objects with many polygons is displayed on the main screen, and a display image of the second virtual 3D space configured of objects with few polygons is displayed on the sub-screen. This makes it possible to reduce the number of polygons required for forming the sub-screen.

When a plurality of groups of display object information is output from the virtual 3D space computation section 100 to the image synthesis section 200, it is preferable that only display object information for objects that will be placed within a predetermined area specified by the player's viewpoint position and direction of gaze is output. For example, it is not necessary to perform image synthesis processing for moving body and map objects that are far from the viewpoint of the player and cannot be seen therefrom. Therefore, it is preferable that display object information for such objects is omitted from the output to the image synthesis section 200. The configuration is such that only display object information for objects that are within a fixed range infront of the player is output for objects to be displayed on the main screen. Similarly, only display object information for objects within a fixed range behind the player is output for objects to be displayed on the sub-screen. This makes it possible to reduce the amount of computations performed by the image synthesis section 200.

The method described below could be used to further reduce the numbers of polygons required for forming the main screen and sub-screen.

The racing cars 48A, 48B, and 48C shown in FIG. 9 could be used as racing cars to appear in the near distance, middle distance, and far distance within the first virtual 3D space. In other words, the near-distance racing car 48A is displayed on the main screen when the distance between the player's car and another racing car is short, but the middle-distance racing car 48B or far-distance racing car 48C is displayed thereon when the distance therebetween is greater. This makes it possible to reduce the number of polygons required for forming the main screen, without sacrificing any feeling of realism in the display image. Within the second virtual 3D space, the racing car 48B is used as a near-distance racing car and the racing car 48C is used as a far-distance racing car, depending on the distance from the player's car. This makes it possible to reduce the number of polygons required for forming the sub-screen to less than those required for forming the main screen. The number of polygons required for forming the sub-screen can be even further reduced by using the near-distance and far-distance racing cars as appropriate in the sub-screen.

A further method that could be used places the buildings 60 of FIG. 3 in the first virtual 3D space, but omits these buildings 60 from the second virtual 3D space. More specifically, none of the display object information shown in FIGS. 6 and 8 is formed for the buildings 60 in the second virtual 3D space. This makes it possible to further reduce the number of polygons required for rending the sub-screen.

Figure 12:
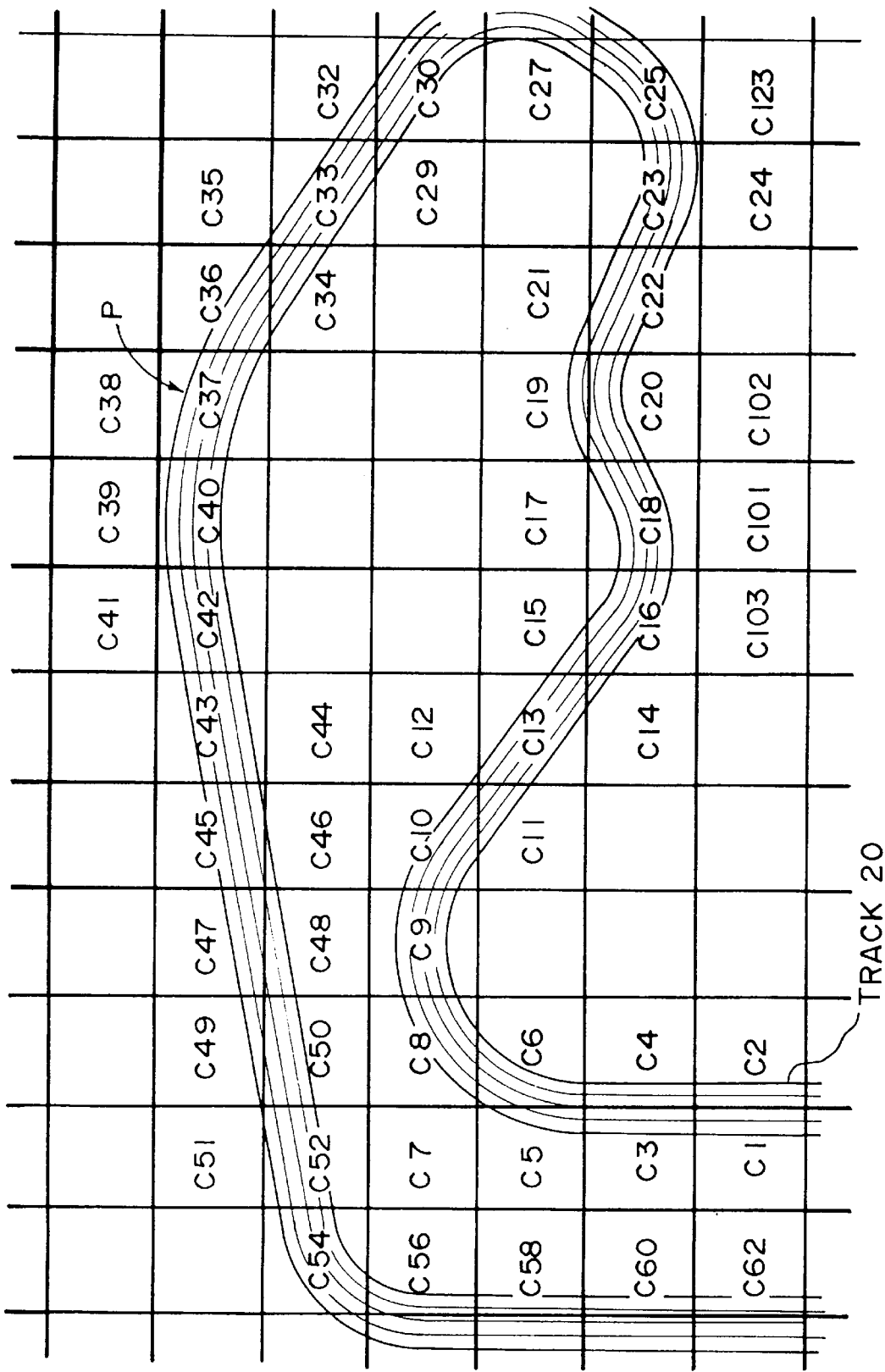
FIG. 12 shows a map divided into a plurality of map blocks.
Figure 13:
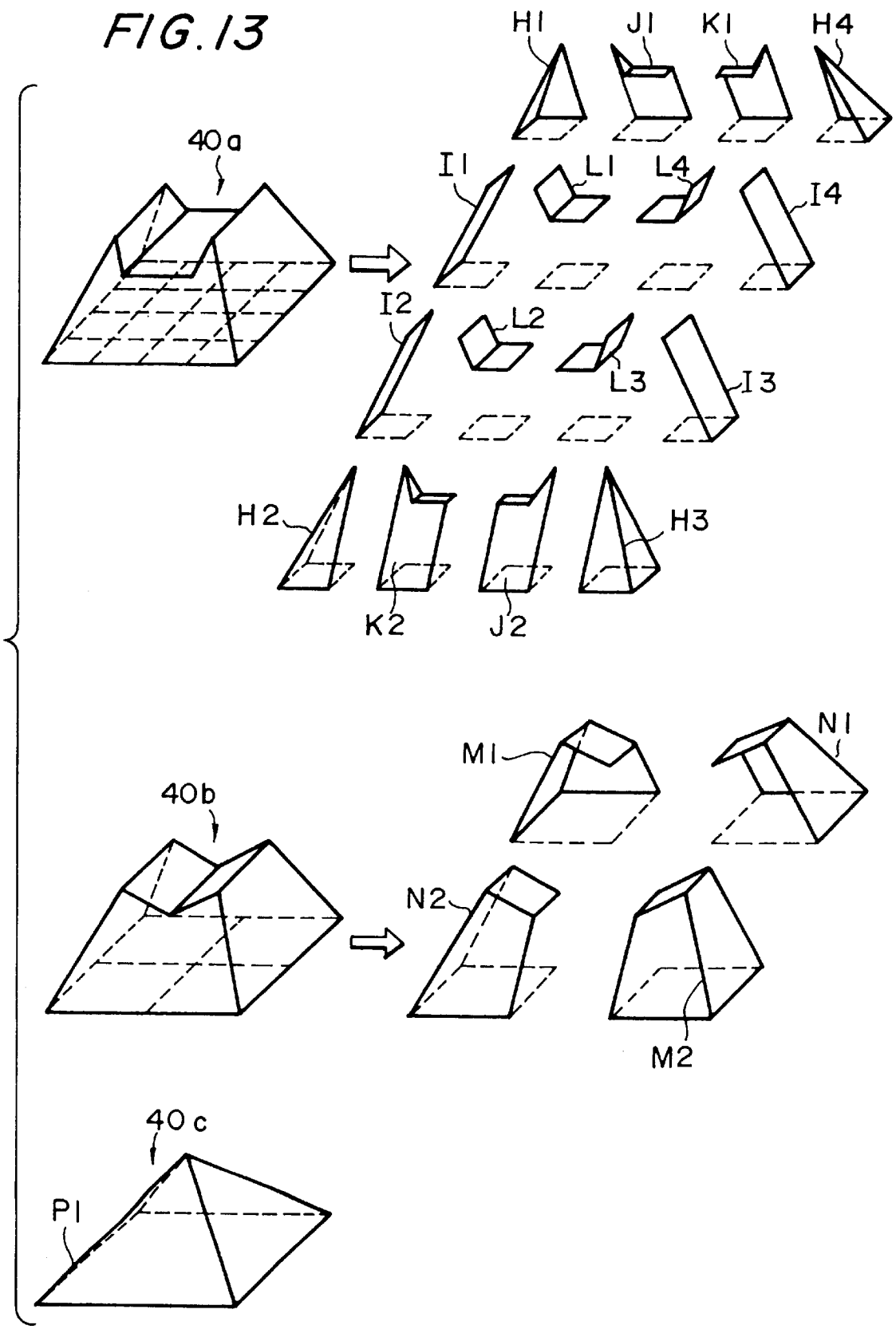
FIG. 13 shows the concept of map objects to be placed in map blocks.

A still further method that could be used concerns the depiction of a map in which the map that forms the virtual 3D space is divided into a predetermined number of map blocks, as shown for example in FIG. 12, and map objects are places in these map blocks. In this case, a mountain 40*a* having a large number of polygons, as shown for example in FIG. 13, is placed in the first virtual 3D space. Mountains 40*b* and 40*c* having smaller numbers of polygons are placed in second and third virtual 3D spaces. This makes it possible to reduce the number of polygons necessary for forming the sub-screen.

Figure 14:
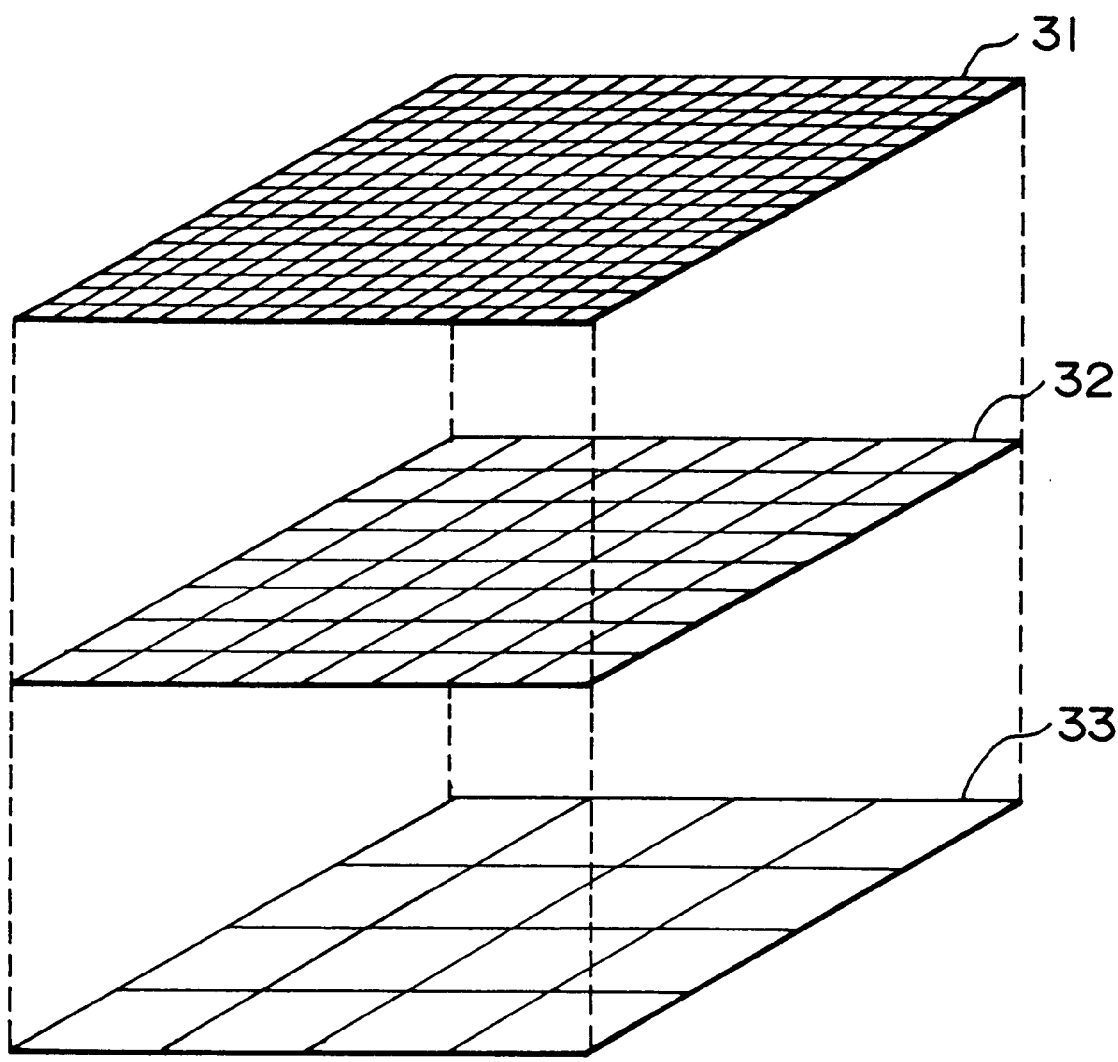
FIG. 14 shows a plurality of types of map block with different numbers of segments.

In addition, first, second, and third map blocks 31, 32, and 33 with different numbers of segments could be provided, as shown in FIG. 14. The first map blocks 31 are used as map segments for the first virtual 3D space. The second map blocks 32 or third map blocks 33 are used as map segments for the second virtual 3D space. If map objects are formed in such a manner that there are approximately the same number of polygons in each map object placed in each of these blocks, the total number of polygons required for configuring this map can be set to be less in the second virtual 3D space than in the first virtual 3D space. This makes it possible to reduce the number of polygons necessary for forming the sub-screen. This method of allocating map blocks with different numbers of segments is particularly effective for enabling most of the map of the virtual 3D space to be seen by the player, such as in a fighter-plane game or flight simulator.

Note that a method could be used in this case by which the first, second, and third map blocks can be allocated within the first virtual 3D space and the second and third map blocks can be allocated within in the second virtual 3D space, depending on the distance between the player's own plane and each of the map segments, in a similar manner to the above described use of far-distance, middle-distance, and near-distance racing cars. This makes it possible to reduce the number of polygons in the main screen as well as in the sub-screen.

The computations for dividing the map into a predetermined number of blocks and placing the map object therein, as described above, are performed by means such as the map setting section 110.

4. Description of Image Supply Section

The image supply section 210 comprises an object image information storage section 212, a processing section 215, a coordinate conversion section 218, a clipping processing section 220, a polygon data conversion section 224, and a sorting processing section 226, as shown in FIG. 15. The clipping processing section 220 further comprises a perspective projection conversion section 222.

Various types of coordinate conversion processing and 3D computation processing are performed by the image supply section 210, in accordance with setting information for the virtual 3D space that is set by the virtual 3D space computation section 100.

Figure 16:
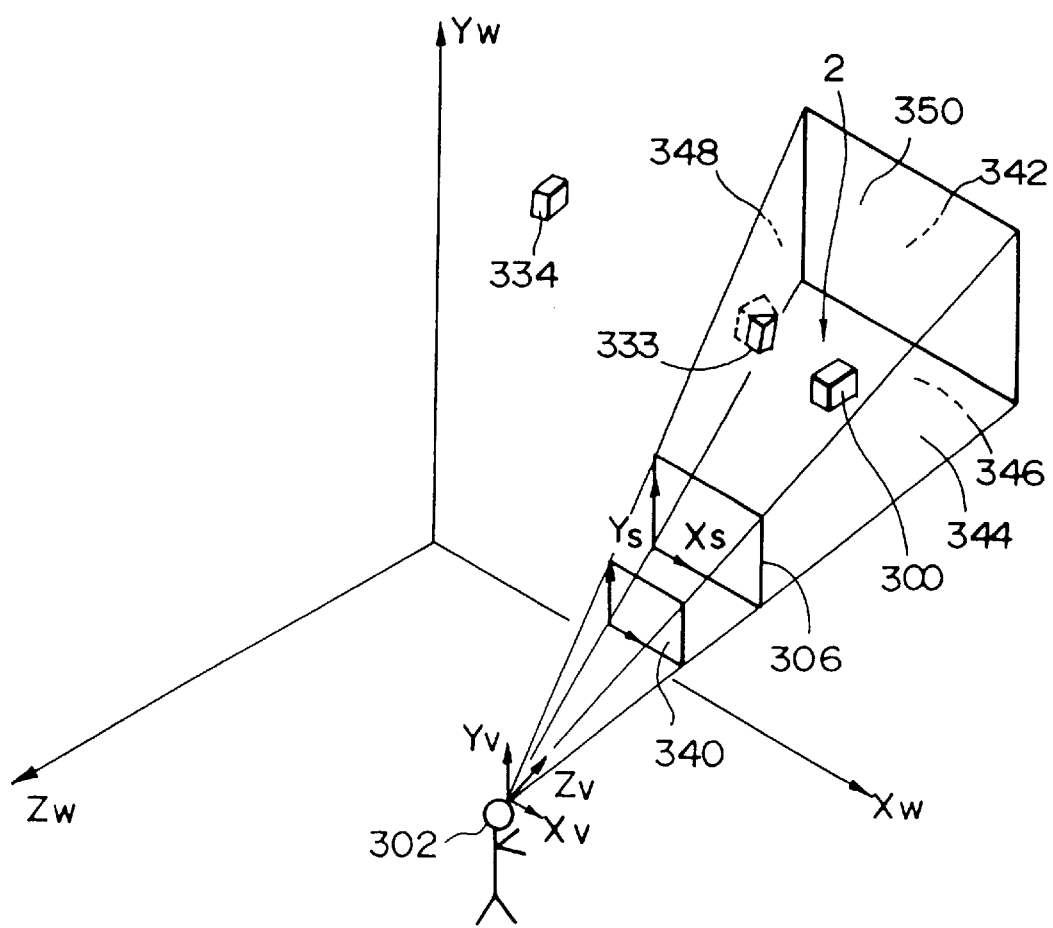
FIG. 16 is a schematic view used for illustrating the 3D computation processing performed by this embodiment.

First of all, computations are performed for objects 300, 333, and 334 that depict elements such as a racing car and the track, to place the polygons that configure these objects in a virtual 3D space expressed in absolute coordinates (world coordinates) (XW, YW, ZW), as shown in FIG. 16. The coordinates of each of these objects are then converted into view coordinates (Xv, Yv, Zv) referenced to the viewpoint of the player 302. A process called clipping processing is then performed, followed by perspective projection conversion processing into screen coordinates (XS, YS). The data is converted into output format, and finally sorting processing is performed.

The operation of the image supply section 210 will now be described in detail.

1) Initialization

At initialization, image information for objects depicting elements such as the racing car and the track is written to the object image information storage section 212. Note, however, that this write is not necessary if the object image information storage section 212 is read-only memory (ROM).

2) Transfer of Frame Data

Viewpoint information that is common to all of the objects, which is information such as the player's viewpoint, angle, and angle of visibility and monitor information, is updated every field (every $1/60$ second, for example) and is transferred from the virtual 3D space computation section 100 through the processing section 215 to the coordinate conversion section 218. The various types of coordinate conversion are performed by the coordinate conversion section 218 on the basis of this data. Information such as the angle and size of the monitor is also transferred to the clipping processing section 220 as data for clipping processing. The thus transferred data is called frame data.

3) Formation of Object Data and Polygon Data

Display object information, which comprises position and orientation information and the object number of each object, is transferred from the virtual 3D space computation section 100 to the processing section 215.

This object number is used as an address to read out image information for the corresponding object from the object image information storage section 212. In other words, if the object number specifies a racing car, for example, image information for that racing car is read from the object image information storage section 212. The image information for each element such as a racing car is stored in the object image information storage section 212 as a collection of a plurality of polygons. A data formatting section 217 forms data that combines the object data and polygon data from the thus read-out data, then the processing section 215 sequentially transfers it to the coordinate conversion section 218.

In this case, object data consists of position and orientation information for the object, together with associated data. Polygon data is image information for the polygons that configure each object, which consists of polygon vertex coordinates, vertex texture coordinates, vertex brightness information, and other associated data.

Figure 17:
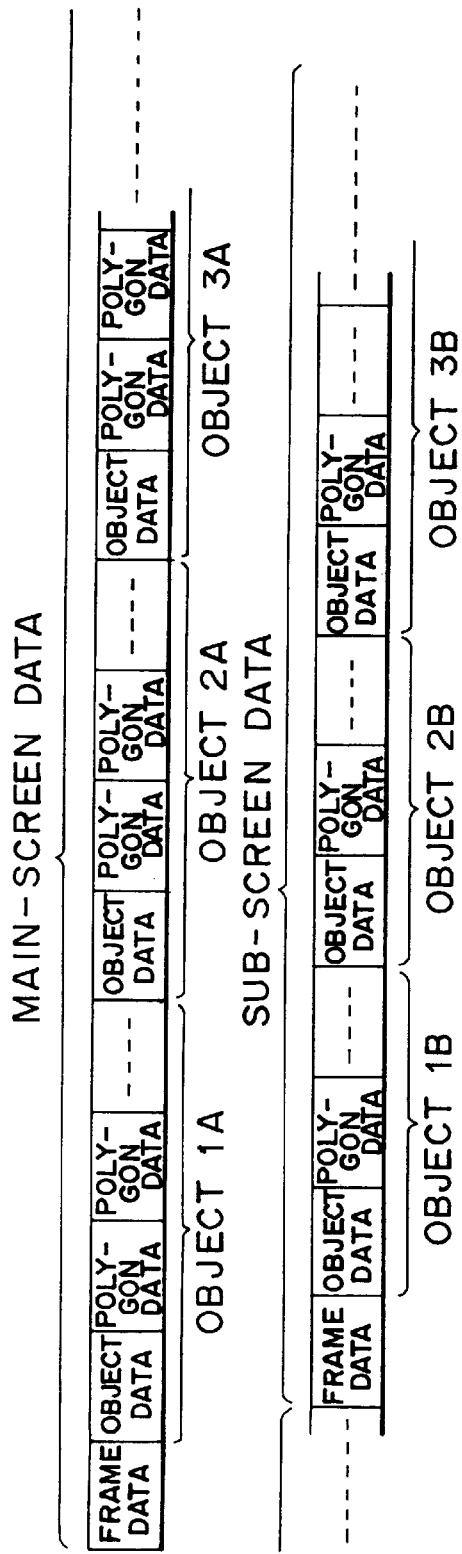
FIGS. 17A and 17B show an example of the data format formed by the data formatting section.

This data is converted by the data formatting section 217 into the data format shown in FIGS. 17A and 17B.

4) Operation of Coordinate Conversion Section, Etc

The coordinate conversion section 218 performs various types of coordinate conversion on the polygon data on the basis of object data consisting of player's viewpoint information transferred from the processing section 215 and racing car position and orientation information transferred from the processing section 215. In other words, the coordinate conversion section 218 rotates the polygon data within the local coordinate system, and transforms it into the world coordinates, and then into the viewpoint coordinates.

The clipping processing section 220 performs clipping processing for polygon data that has been subjected to this coordinate conversion. This data is then subjected to perspective projection conversion into the screen coordinate system by the perspective projection conversion section 222 within the clipping processing section 220. Note that the same hardware can be used for this clipping processing and perspective projection conversion processing in this embodiment.

The data for polygons that were changed by the clipping processing into polygonal shapes that are not four-sided is converted into data for four-sided polygons by the polygon data conversion section 224. The converted polygon data is output to the sorting processing section 226 of the next stage. More specifically, if a polygon has been changed into a triangular shape by the clipping processing, for example, conversion processing is performed to change that three-sided polygon into a pseudo-four-sided polygon. If the vertices of the original three-sided polygon are numbered 1, 2, and 3, the vertices of the four-sided polygon after the conversion are allocated vertex numbers. 1, 2, 3, and 1 of the original polygon. The data is converted into four-sided polygon data by specifying information such as the vertex coordinates, vertex texture coordinates, and vertex brightness information of the original polygon according to the thus allocated vertex numbers. Similarly, if a polygon has been changed into a five-sided shape by the clipping processing, for example, conversion processing is performed to divide that polygon into a four-sided polygon and a pseudo-four-sided polygon (similar to the above described way in which a three-sided polygon is converted into a pseudo-four-sided polygon). If the vertices of the original five-sided polygon are numbered 1, 2, 3, 4, and 5, the vertices of the resultant two four-sided polygons are allocated vertex numbers 1, 2, 3, and 4 and 1, 4, 5, and 1 of the original polygon. The data is converted into four-sided polygon data by specifying information such as the vertex coordinates, vertex texture coordinates, and vertex brightness information of the original polygon according to the thus allocated vertex numbers. In a similar manner, if a polygon has been changed into a six-sided shape by the clipping processing, it is divided into two four-sided polygons in a similar way to that described above.

Note that any polygon that is reversed into a back face polygon by horizontal(right-and-left) inversion processing of the image during image forming for the rear-view mirror in accordance with this embodiment is subjected to conversion processing by the polygon data conversion section 224 to change it into a frontface polygon. For example, if a polygon with vertex numbers 1, 2, 3, and 4 is subjected to horizontal inversion, the allocation of vertex numbers for the converted polygon is 1, 4, 3, and 2, and details such as the vertex coordinates of the original polygon are specified by the thus substituted vertex numbers. This means that it is possible for a polygon that was reversed by the horizontal inversion processing to be output. As a further example, when a polygon that has been turned into a five-sided polygon by the clipping processing described above is subjected to horizontal inversion processing, it is divided into a four-sided polygon and a pseudo-four-sided polygon, and the vertex numbers allocated to these four-sided polygons are made to be 1, 4, 3, and 2 and 1, 5, 4, and 1, respectively. This means it is possible to simultaneously perform polygon division processing and conversion processing for the backface polygon due to horizontal inversion into the frontface polygon.

With this embodiment, main-screen data and subsidiary-screen data as shown in FIG. 17A is formed by the data formatting section 217 and this data is transferred to other sections such as the coordinate conversion section 218 as data to be processed within each frame. In this case, the main-screen data starts with frame data, followed by data for objects 1A, 2A, 3A, and so on in sequence. In other words, data relating to all the objects to be displayed on the main screen in that frame is arrayed in sequence. Polygon data for all of the polygons configuring a particular object is arrayed after the object data for object 1A, for example. This polygon data comprises details of the polygons, such as vertex coordinates information, in the format shown in FIG. 17B. In the same manner, polygon data for all of the polygons configuring object 2A is arrayed after the object data for that object.

The sub-screen data is formed in exactly the same format as that of the main-screen data. Note, however, that objects 1A and 1B have the same object placement position and orientation, but different numbers of groups of polygon data linked to the object data. Objects 2A and 2B differ in the same manner. This embodiment makes it possible to have different numbers of polygons for objects displayed by the main screen and the sub-screen, by having the data formatting section 217 create data in the above format. Further differences, such as a difference in viewpoint position or orientation, can be achieved between the main-screen and sub-screen data. In such a case, the contents of the frame data positioned at the start of each of the main-screen data and the sub-screen data could be made different. For example, if the frame data for the main-screen data is set such that the direction of gaze is forward and the frame data for the sub-screen data is set such that the direction of gaze is rearward, a rear-view mirror can be formed on top of the main screen which displays a forward image. Note, however, that it is necessary in such a case to subject the image to horizontal inversion before displaying it, but this horizontal inversion processing can be performed by the polygon data conversion section 224 of this embodiment, as described previously.

5. Description of Image forming section

The image forming section 228 is designed to compute image information within polygons, based on vertex image information given for each vertex of these polygons, then output this information to the CRT 10. It comprises a processor section (texture computation means) 230, a texture information storage section 242, and a palette and mixer circuit 244, as shown in FIG. 18.

In this embodiment, image synthesis by methods called texture mapping and Gouraud shading is performed in order to form a higher-quality image more efficiently. The concepts of these methods are briefly described below.

Figure 19:
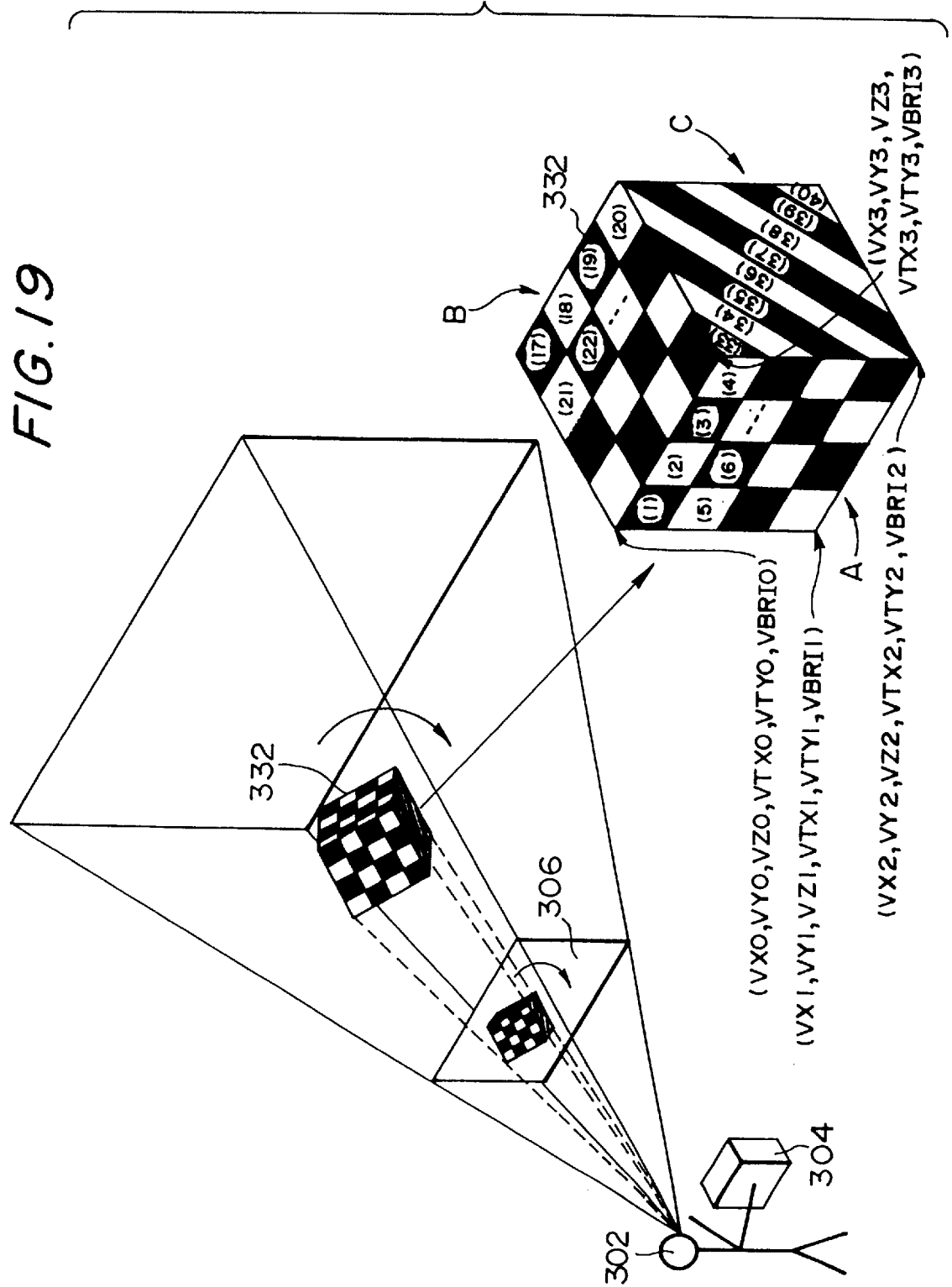
FIG. 19 is a schematic view used for illustrating a texture mapping method.

The concept of this texture mapping method is shown in FIG. 19.

When an image is synthesized in the prior art in such a manner that a checkerboard or striped pattern is implemented on each of the surfaces of an object 332, shown in FIG. 19, the object is divided into polygons (1) to (80) (where polygons (41) to (80) are not shown in the figure) and image processing is performed for all of the polygons. That is because no more than one color can be specified when painting each polygon in a prior-art image synthesis device. As a result, an extremely large number of polygons is required for synthesizing a high-quality image on which a complicated pattern or other effect is implemented, and thus it is substantially impossible to synthesis such a high-quality image.

With this embodiment, coordinate conversion such as rotation, translation, and perspective projection conversion and processing such as clipping for the object 332 are performed for each of polygons A, B, and C that configure each of the surfaces thereof (more specifically, for each polygon vertex). A checkerboard or striped pattern is handled as a texture apart from polygon processing. In other words, the texture information storage section 242 is provided within the image forming section 228, as shown in FIG. 18, and image information for texture information to be applied to each of the 3D polygons, such as a checkerboard or striped pattern, is stored therein.

Addresses in the texture information storage section 242 that specify this texture information are given as vertex texture coordinates VTX, VTY for each 3D polygon. More specifically, vertex texture coordinates (VTX0, VTY0), (VTX1, VTY1), (VTX2, VTY2), and (VTX3, VTY3) are set for each of the vertices of polygon A in FIG. 19.

The processor section 230 within the image forming section 228 obtains texture coordinates TX, TY for all the dots within a polygon, from these vertex texture coordinates VTX, VTY. Corresponding texture information is read out from the texture information storage section 242 by the thus obtained texture coordinates TX, TY, and is output to the palette and mixer circuit 244. This makes it possible to synthesize the image of a 3D object on which a texture such as checks or stripes is implemented, as shown in FIG. 19.

In this embodiment, the above object 332 is represented by polygonal solids. This leads to a problem with brightness continuity at each boundary between polygons. For example, if a plurality of polygons is used to depict a sphere, but all of the dots within each polygon are set to the same brightness, a state occurs in which "roundness" cannot be expressed at boundaries between polygons, even though such roundness is desired. This problem is avoided in this embodiment by use of a method called Gouraud shading. With this method, the vertex brightness information VBRI0 to VBRI3 of FIG. 19 is given for each vertex of each 3D polygon, in the same manner as that described above with reference to the texture mapping method, and brightness information for all the dots within each 3D polygon is obtained by interpolation from this vertex brightness information VBRI0 to VBRI3 when the final image is displayed by the image forming section 228.

Figure 20:
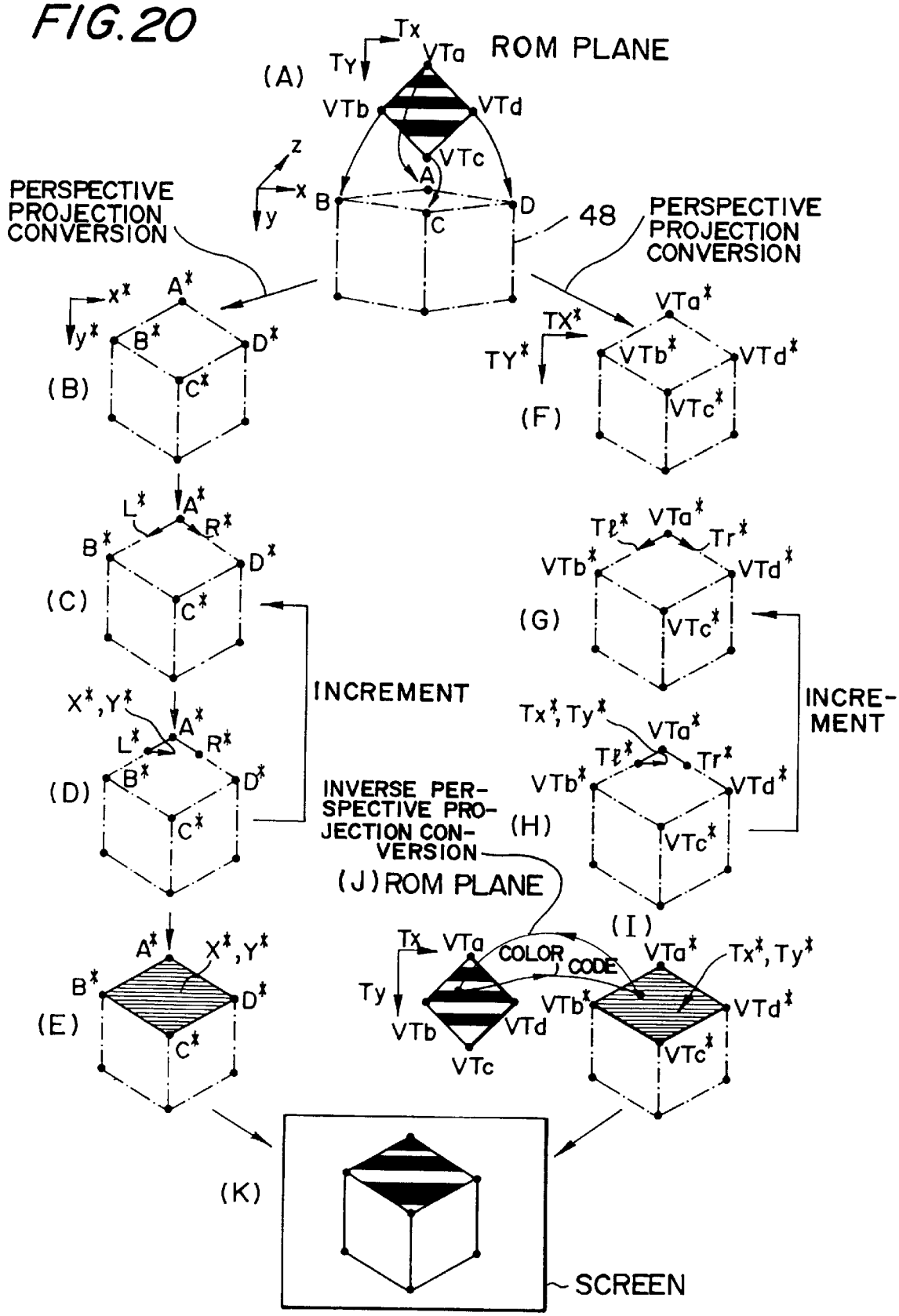
FIGS. 20(A) to 20(K) pictorially illustrate the texture mapping method of this embodiment.

The flow of computation processing for texture mapping is shown pictorially in (A) to (K) of FIG. 20. As described previously, computations for forming all of the image information within polygons is performed by the image forming section 228, on the basis of polygon vertex image information. In this case, texture information that is to be applied to the polygons is stored in a texture information storage section 242, and texture coordinates TX, TY are required for reading out this texture information. The computation processing that derives all of the perspective conversion texture coordinates TX*, TY* within a polygon is shown pictorially in (F), (G), (H), and (I) of FIG. 20. Similarly, the computation processing that derives perspective conversion display coordinates X*, Y* that are coordinates for the texture information to be displayed is shown pictorially in (B), (C), (D), and (E) of FIG. 20. The above computations are performed by the processor section 230. The thus computed perspective conversion texture coordinates TX*, TY* are subjected to inverse-perspective projection conversion into texture coordinates TX, TY, as shown in (J) of FIG. 20, and texture information is read out from the texture information storage section 242 in accordance with the thus converted texture coordinates TX, TY. Finally, image synthesis using the read-out texture information is performed at the thus computed coordinate position X*, Y*, as shown in (K) of FIG. 20.

The implementation of texture mapping on a racing car object is shown pictorially in FIGS. 21A and 21B. Texture information 902 to 916 as shown in FIG. 21A is stored in the texture information storage section 242, and an extremely realistic racing car can be obtained by mapping this information onto a racing car object, as shown in FIG. 21B.

Figure 22:
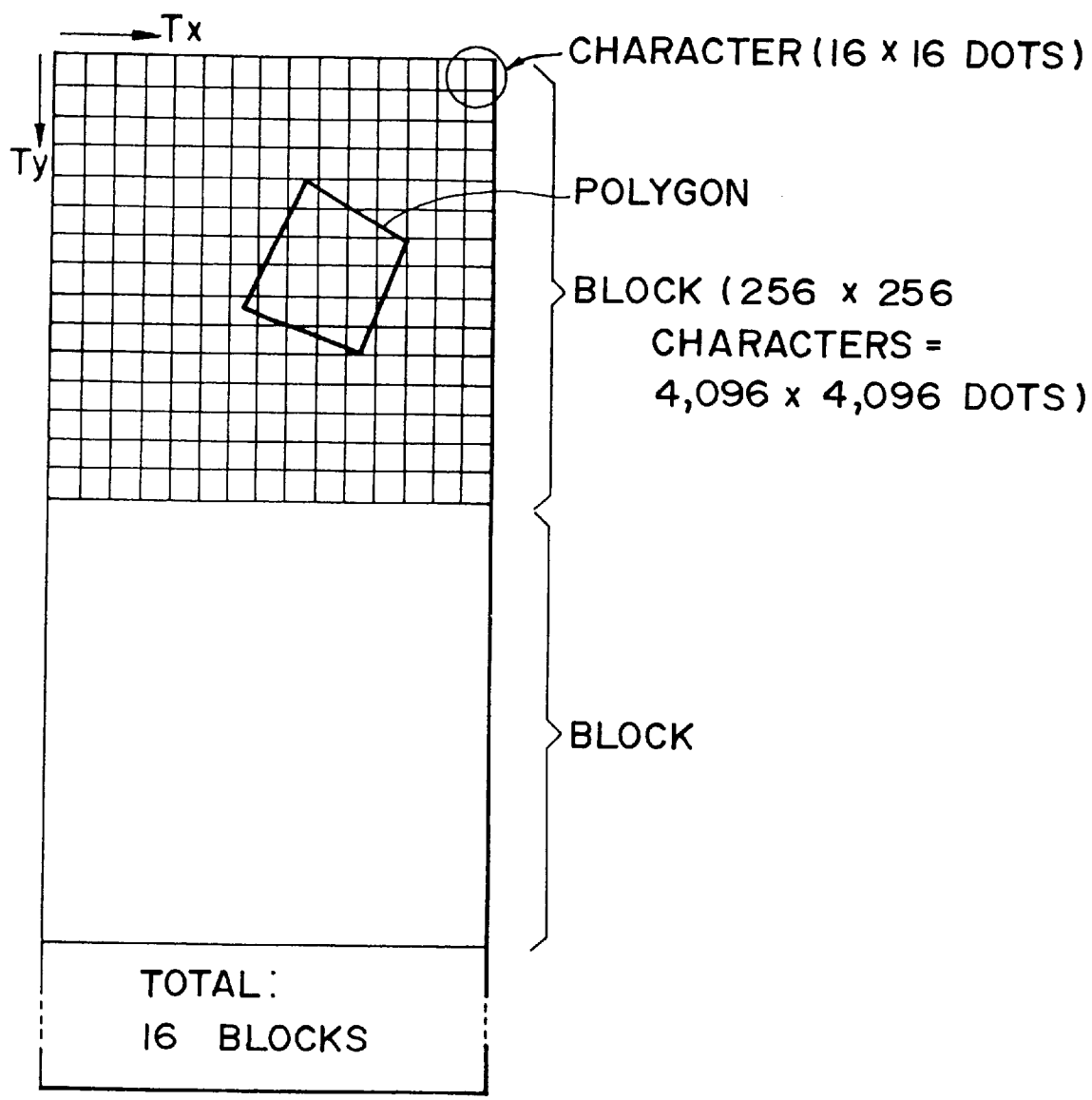
FIG. 22 shows an example of a stored texture plane (texture space) formed on the texture information storage section.

An example of a texture plane that is configured by the texture information storage section 242 is shown in FIG. 22. As shown in this figure, texturing of a polygon is performed by specifying texture coordinates TX, TY for the texture that is to be mapped onto the polygon.

In this embodiment, texture mapping is performed not only for display objects in the main screen, but also for display objects in the sub-screen. For example, textures consisting of an asphalt-like surface and a center-line 26 are implemented on the road surface 23 that is displayed in the rear-view mirror (sub-screen) 2 of FIG. 4 in addition to the road surface 21 of the main screen 1. This enhances the realism of the image displayed by the sub-screen. In this case, this embodiment uses the same texture information in common, stored in the texture information storage section 242, for a display object in the first virtual 3D space and a display object in the second virtual 3D space that is placed at the same position and orientation.

Figure 23A:
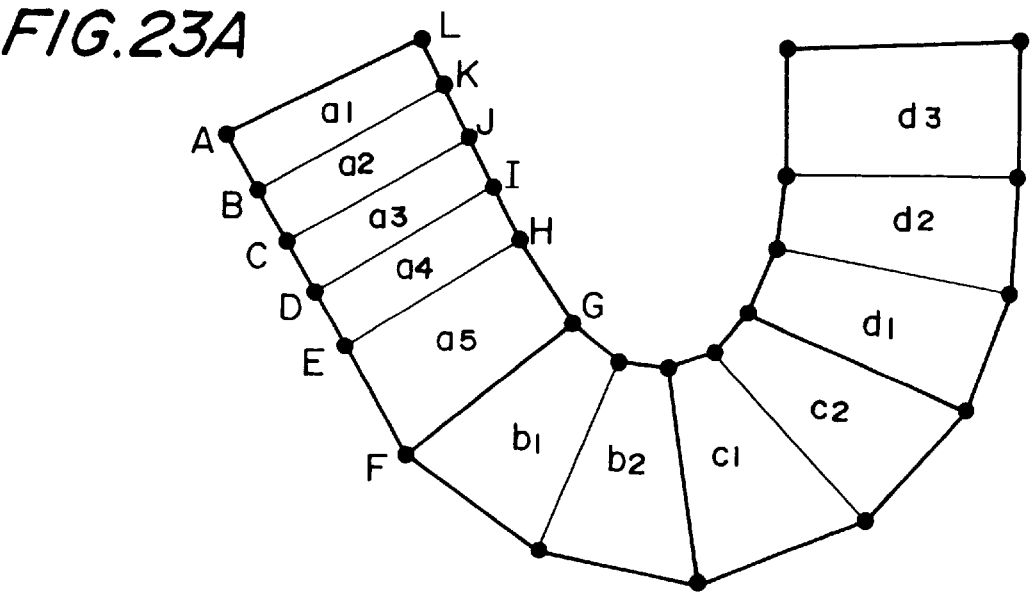
FIGS. 23A and 23B show examples of map objects to be placed in the first and second virtual 3D spaces.
Figure 23B:
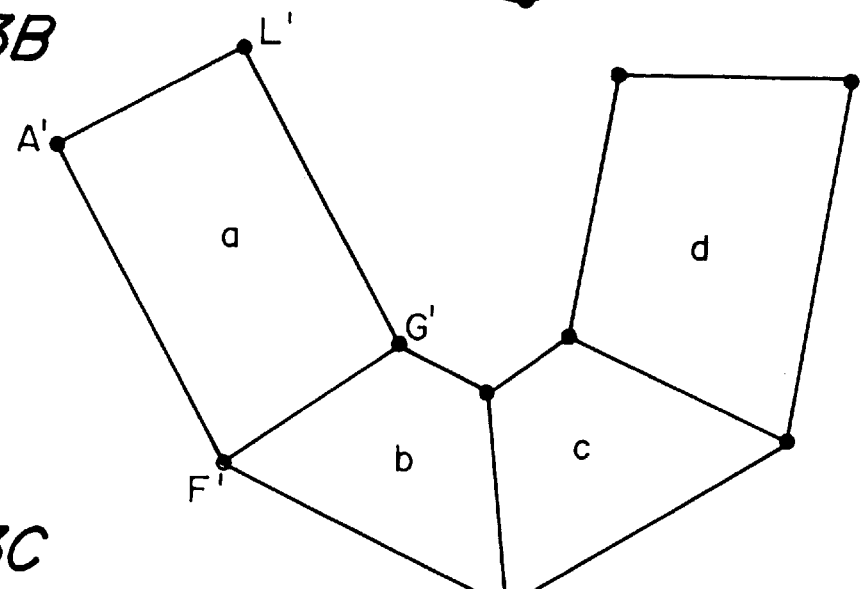
Figure 23C:
FIG. 23C shows an example of texture information mapped onto these map objects and a texture plane including this texture information.

An example of a map object placed in the first virtual 3D space is shown in FIG. 23A. The map object shown in this figure is configured of polygons a1 to a5, b1, b2, c1, c2, and d1 to d3. An example of a map object placed in the second virtual 3D space is shown in FIG. 23B. This map object depicts the map object of FIG. 23A in a simplified form, and is configured of polygons a, b, c, and d. These map objects are placed at the same position and orientation in the corresponding virtual 3D spaces. An example of texture information applied to these map objects and a texture plane which stores this texture information is shown in FIG. 23C. This texture information consists of an asphalt-like pattern and a center-line.

The mapping of this texture on the map object of FIG. 23A is described below. Consider the texture mapping of the polygonal consisting of vertices A, B, K, and L, for example.

In this case, (VTXA, VTYA), (VTXB, VTYB), (VTXK, VTYK), and (VTXL, VTYL) of FIG. 23C are given as vertex texture coordnates for the polygon a1. Thus texture coordinates TX, TY are obtained for all the dots (pixels) within the polygon a1 by the processor section 230, using the processing shown in (A) to (K) of FIG. 20. The texture mapping of this polygon a1 is then completed by reading out texture information from the texture information storage section 242 in accordance with these coordinates TX, TY. Texture mapping can be performed in the same manner for the other polygons a2, a3, a4, and a5.

At the same time, texture mapping is performed by this embodiment for the simplified map object shown in FIG. 23B. In this case, consider the texture mapping of the polygon a consisting of vertices A', F', G', and L'. (VTXA, VTYA), (VTXF, VTYF), (VTXG, VTYG), and (VTXL, VTYL) of FIG. 23C are given as vertex texture coordinates for the polygon a. In to other words, the same vertex texture coordinates as those provided for points A, F, G, and L of FIG. 23A are given. Thus texture coordinates TX, TY are obtained for all the dots within the polygon a by the processing of the processor section 230. The texture mapping of this polygon a is then is completed by reading out texture information from the texture information storage section 242 in accordance with these coordinates TX, TY.

In this manner, this embodiment uses texture information in common between a detailed object and a simplified object corresponding thereto. Each polygon has only vertex texture coordinates, and texture coordinates for dots within each polygon can be obtained by interpolation processing shown in (A) to (K) of FIG. 20. Therefore, this texture information can be used in common and also the same texture shown in FIG. 23C can be mapped to the map objects shown in FIGS. 23A and 23B. Since this use of texture information in common makes it unnecessary to provide two types of data in the texture information storage section 242 for a detailed object and a simplified object, the storage capacity required of the texture information storage section 242 can be reduced and thus a reduction in size of the hardware can be designed.

Note that the vertex texture coordinates given for each polygon are stored as part of the image information in the object image information storage section 212 (see FIG. 17B). Therefore, the same vertex texture coordinates as those of vertices A, F, G, and L of FIG. 23A are given for the vertices A', F', G', and L' of the polygon a of FIG. 23B, and these are stored in the image information storage section 212. In this embodiment, vertex brightness information VBRI is given in common for vertices A', F', G', and L' and for A, F, G, and L. This ensures that brightness computations required for the Gouraud shading method can be performed in a similar manner for the polygon a and the polygons a1 to a5.

Note that this invention is not limited to the above described embodiment; it can be implemented in various different manners within the scope of the invention.

For example, this embodiment was described as relating to a racing car game by way of example, but the present invention is not limited thereto; it can be applied to any other type of 3D game in which a map is formed in a 3D fashion, such as an outer-space game.

Similarly, this invention is not limited to an arcade 3D game; it can equally well be applied to other purposes such as a domestic games machine, a flight simulator, or a driving simulator used in a driving school.

In addition, the computations performed by the virtual 3D space computation section and other sections could be performed by a dedicated image processing device, or they could be performed by means such as a microprocessor.

Similarly, the computations performed by sections such as the image synthesis section are not limited to those described with reference to the embodiment herein, and the method used for texture mapping is not limited to that described above.

Figure 24:
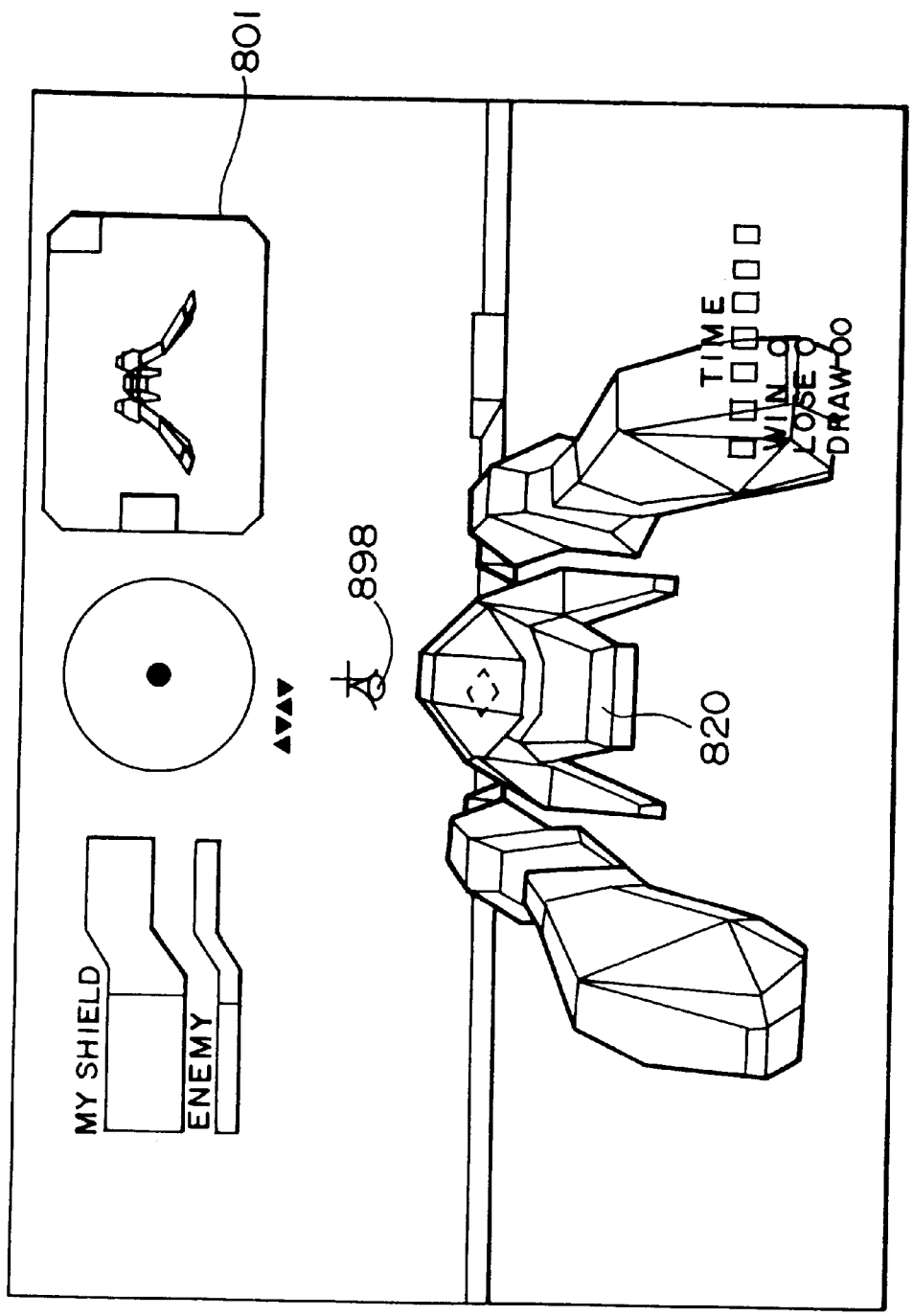
FIG. 24 is a schematic view used for illustrating another application example of the sub-screen.
Figure 25A:
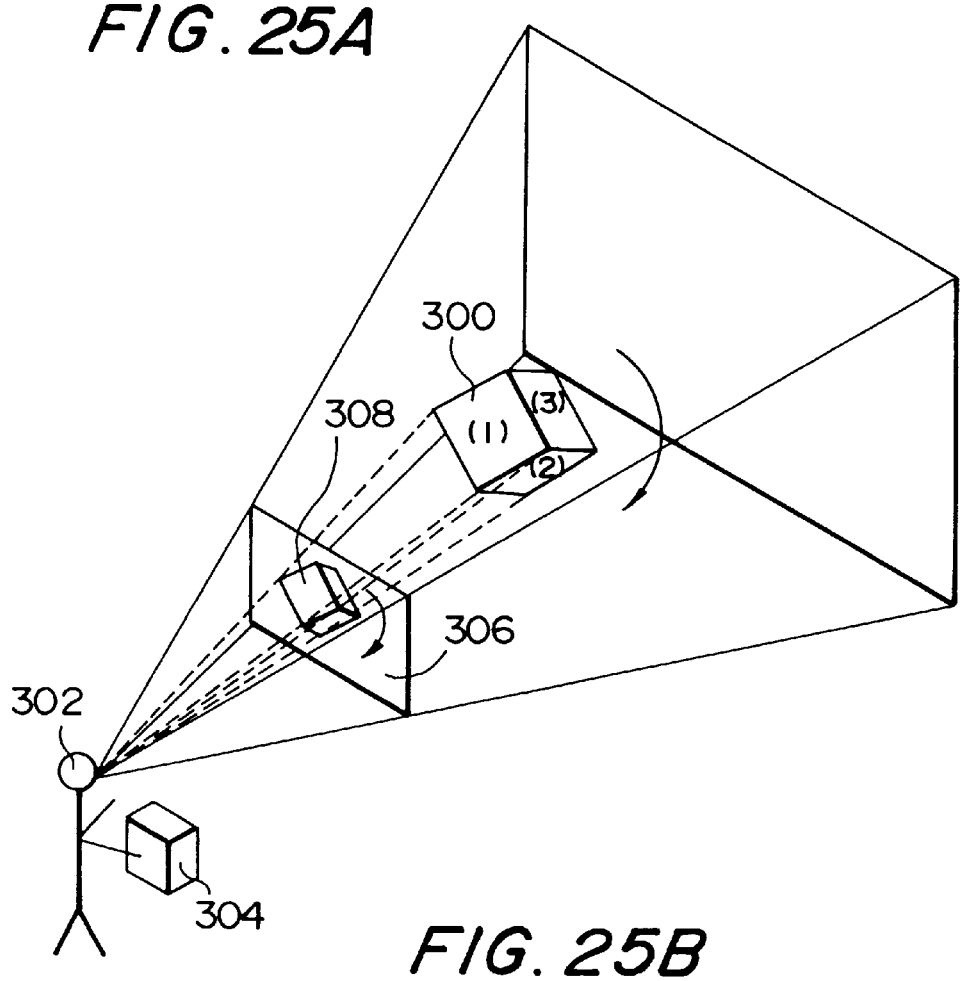
FIG. 25A is a schematic view used for illustrating the concept of the 3D simulator apparatus.
Figure 25B:
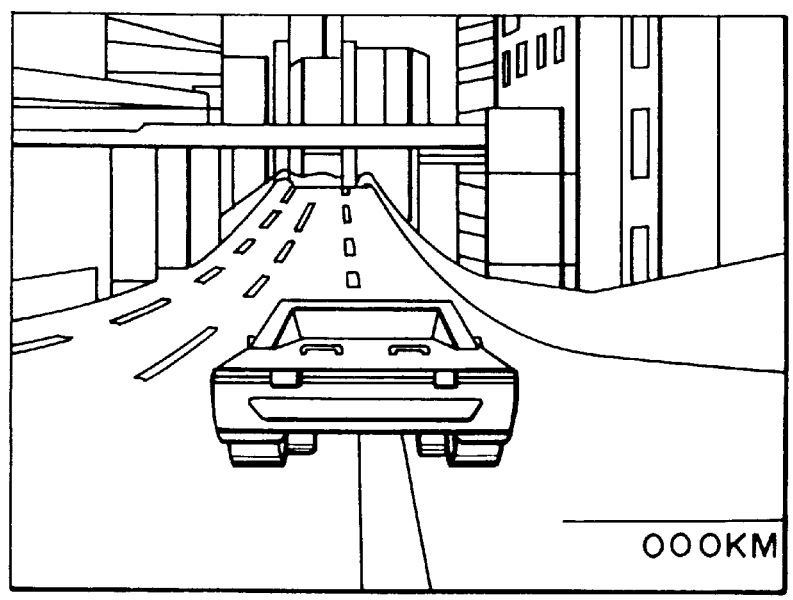
FIG. 25B shows an example of the screen formed by this 3D simulator apparatus.

The sub-screen provided by this invention is not limited to depicting the rear-view mirror described with reference to the embodiment herein; it can equally well be applied to various other depictions. For example, it could be applied to a depiction of a side mirror. Taking as a further example a futuristic tank warfare game as shown in FIG. 24, an image as seen from above a futuristic tank 820 driven by the player could be displayed on a sub-screen 801. This sub-screen 801 could also display an image as seen from a camera mounted in the nose of a missile 898 fired from the futuristic tank 820, for example.

This invention was also described by way of a simplified depiction in which a small number of polygons is used for each display object on the sub-screen, but it can equally well refer to a more complicated depiction in which a large number of polygons is used for each display object on the sub-screen. Such an embodiment would make it possible to depict a magnifying glass on the sub-screen, to enable a magnified view of an object shown on the main screen, for example.

The pseudo-3D image formed by this invention can also be applied to a head-mounted display (HMD), instead of the CRT 10.

We claim:

1. A three-dimensional(3D) simulator apparatus comprising:

virtual three-dimensional(3D) space computation means for computing and forming virtual three-dimensional (3D) spaces by setting either position or position and orientation of a plurality of display objects configuring said virtual 3D spaces; and image synthesis means for synthesizing field-of-view images as seen from any desired viewpoint within said virtual 3D spaces, based on computation results from said virtual 3D space computation means, wherein:

said virtual 3D space computation means comprises:

means for forming at least two of the virtual 3D spaces wherein first display objects in a first one of said virtual 3D spaces and second display objects in a second one of said virtual 3D spaces are used to represent same display objects, but a first number of polygons configuring each of said first display objects in the first one of said virtual 3D spaces is different from a second number of polygons configuring each of said second display objects in the second one of said virtual 3D spaces; and said image synthesis means comprises:

means for synthesizing a first field-of-view image in the first one of said virtual 3D spaces as an image to be displayed on a main screen, wherein the first number of polygons configuring each of said first display objects is larger than the second number of polygons configuring each of said second display objects in the second one of said virtual 3D spaces; and means for synthesizing a second field-of-view image in the second one of said virtual 3D spaces as an image to be displayed on at least one sub-screen, wherein the second number of polygons configuring each of said second display objects is smaller than the first number of polygons configuring each of said first display objects in the first one of said virtual 3D spaces.

2. The three-dimensional simulator apparatus as defined in claim 1, further comprising:

texture computation means for mapping texture to said display objects; and texture information storage means for storing information on said texture to be maped by said texture computation means, wherein said texture computation means comprises:

means for using texture information stored in said texture information storage means in common, for said first display objects in the first one of said virtual 3D spaces and said second display objects in the second one of said virtual 3D spaces.

3. A three-dimensional(3D) simulator apparatus comprising:

virtual three-dimensional(3D) space computation means for computing and forming virtual three-dimensional (3D) spaces by setting display object information that comprises either an object number and position information or an object number and position and orientation information for each of a plurality of display objects configuring said virtual 3D spaces;

image information storage means for storing image information for an object specified by said object number; and image synthesis means for synthesizing field-of-view images as seen from any desired viewpoint within said virtual 3D spaces, based on said display object information and said image information read out from said image information storage means according to said object numbers, wherein said virtual 3D space computation means comprises:

means for forming a plurality of groups of display object information having either identical position information or identical position and orientation information but different object numbers, said image information storage means storing said image information which has different numbers or polygons configuring each of said objects specified by said different object numbers; and said image synthesis means comprises:

means for synthesizing a first field-of-view image to be displayed on a main screen, based on said image information for a first object with a larger number of polygons; and means for synthesizing a second field-of-view image to be displayed on at least one sub-screen, based on said image information for a second object with a smaller number of polygons, said first object and said second object being used to represent a same object.

4. The three-dimensional simulator apparatus as defined in claim 3, wherein:

said image information storage means stores said image information for a plurality of objects with different numbers of polygons;

said image synthesis means comprises:

means for synthesizing field-of-view images based on said image information for objects that are selected according to a given selection range from within said plurality of objects, and wherein a first selection range of said objects for synthesizing said field-of-view image on said main screen comprises more of said objects with larger numbers of polygons than a second selection range of said objects for synthesizing said field-of-view image for said sub-screen.

5. The three-dimensional simulator apparatus as defined in claim 3, wherein:

said virtual 3D space computation means comprises:

means for omitting the formation of said plurality of groups of display object information for some of said display objects, whereby:

display on said sub-screen is omitted for some of said display objects that are displayed on said main screen.

6. The three-dimensional simulator apparatus as defined in claim 4, wherein:

said virtual 3D space computation means comprises:

means for omitting the formation of said plurality of groups of display object information for some of said display objects, whereby:

display on said sub-screen is omitted for some of said display objects that are displayed on said main screen.

7. The three-dimensional simulator apparatus as defined in claim 3, further comprising:

means for dividing a map configuring said virtual 3D space into a predetermined number of segments and displaying said map by placing map objects in a segmented map; wherein:

the number of segments of a map displayed on said main screen is greater than the number of segments of a map displayed on said sub-screen.

8. The three-dimensional simulator apparatus as defined in claim 3, further comprising:

texture computation means for performing computations for implementing texture with respect to polygons configuring objects; and texture information storage means for storing information on said texture implemented by said texture computation means, wherein:

said image information storage means stores vertex texture coordinates for specifying texture information in said texture information storage means as part of said image information; and said texture computation means comprises:
 means for using in common some of said vertex texture coordinates used for implementing texture on polygons of objects to be displayed on said main screen, during implementation of texture on polygons of objects to be displayed on said sub-screen.

9. A method of synthesizing an image, comprising:

a virtual three-dimensional(3D) space computation step for computing and forming virtual three-dimensional (3D) spaces by setting either position or position and orientation of a plurality of display objects configuring said virtual 3D spaces; and an image synthesis step for synthesizing field-of-view images as seen from any desired viewpoint within said virtual 3D spaces, based on computation results from said virtual 3D space computation step, wherein:

said virtual 3D space computation step comprises:
 forming at least two of the virtual 3D spaces wherein first display objects in a first one of said virtual 3D spaces and second display objects in a second one of said virtual 3D spaces are used to represent same display objects, but a first number of polygons configuring each of said first display objects in the first one of said virtual 3D spaces is different from a second number of polygons configuring each of said second display objects in the second one of said virtual 3D spaces; and said image synthesis step comprises:
 synthesizing a first field-of-view image in the first one of said virtual 3D spaces as an image to be displayed on a main screen, wherein the first number of polygons configuring each of said first display objects is larger than the second number of polygons configuring each of said second display objects in the second one of said virtual 3D spaces; and
 synthesizing a second field-of-view image in the second one of said virtual 3D spaces as an image to be displayed on at least one sub-screen, wherein the second number of polygons configuring each of said second display objects is smaller than the first number of polygons configuring each of said first display objects in the first one of said virtual 3D spaces.

10. The image synthesis method as defined in claim 9, further comprising:

a texture computation step for mapping texture to said display objects, based on texture information stored in a given texture information storage means, said texture computation step comprising:
 using said texture information stored in said texture information storage means in common, for said first display objects in the first one of said virtual 3D spaces and said second display objects in the second one of said virtual 3D spaces.

11. A method of synthesizing an image, comprising:

a virtual three-dimensional(3D) space computation step of computing and forming virtual three-dimensional (3D) spaces by setting display object information that comprises either an object number and position information or an object number and position and orientation information for each of a plurality of display objects configuring said virtual 3D spaces; and an image synthesis step of synthesizing field-of-view images as seen from any desired viewpoint within said virtual 3D spaces, based on said display object information and image information read out from a given image information storage means according to said object number, wherein:

said virtual 3D space computation step comprises:
 forming a plurality of groups of display object information having either identical position information or identical position and orientation information but different object numbers;
 said image information storage means storing said image information which has different numbers of polygons configuring each of said objects specified by said different object numbers; and said image synthesis step comprises:
 synthesizing a first field-of-view image to be displayed on a main screen, based on said image information for a first object with a larger number of polygons; and
 synthesizing a second field-of-view image to be displayed on at least one sub-screen, based on said image information for a second object with a smaller number of polygons, said first object and said second object being used to represent a same object.

12. The image syntheses method as defined in claim 11, further comprising:

a texture computation step for performing computations for implementing textures with respect to polygons configuring display objects, based on texture information stored in a given texture information storage means, wherein:

said image information storage means stores vertex texture coordinates for specifying texture information in said texture information storage means as part of said image information; and said texture computation step comprises:
 using in common some of said vertex texture coordinates used for implementing texture on polygons of objects to be displayed on said main screen, during implementation of texture on polygons of objects to be displayed on said sub-screen.

13. A three-dimensional(3D) simulator apparatus comprising:

virtual three-dimensional(3D) space computation means for computing and forming virtual three-dimensional (3D) spaces by setting either position or position and orientation of a plurality of display objects configuring said virtual 3D spaces; and image synthesis means for synthesizing field-of-view images as seen from any desired viewpoint within said virtual 3D space, based on computation results from said virtual 3D space computation means, wherein:

said virtual 3D space computation means forms a first virtual 3D space configured by first display objects and a second virtual 3D space configured by second display objects, said first display objects and said second display objects being used to represent same display objects, but a degree of detail of said second display objects being lower than a degree of detail of said first display objects; and said image synthesis means synthesizes a first field-of-view image in said first virtual 3D space with said high detailed first display objects, as an image to be displayed on a main screen and synthesizes a second field-of-view image in said second virtual 3D space with said low detailed second display objects, as an image to be displayed on at least one sub-screen.

14. The three-dimensional simulator apparatus as defined in claim 13, wherein:
sad second virtual 3D space is formed by changing said first virtual 3D space partially.

15. A three-dimensional(3D) simulator apparatus comprising:
virtual three-dimensional(3D) space computation means for computing and forming virtual three-dimensional (3D) spaces by setting either position or position and orientation of a plurality of display objects configuring said virtual 3D spaces; and
image synthesis means for synthesizing field-of-view images as seen from any desired viewpoint within said virtual 3D spaces, based on computation results from said virtual 3D space computation means, wherein:
said virtual 3D space computation means forms a first virtual 3D space configured by first display objects and a second virtual 3D space configured by second display objects, said first display objects and said second display objects being used to represent same display objects, but with some of said second display objects omitted from being placed in said second virtual 3D space while some of said first display objects corresponding to some of said second display objects being placed in said first virtual 3D space; and
said image synthesis means synthesizes a first field-of-view image in said first virtual 3D space as an image to be displayed on a main screen with some of said first display objects being displayed and synthesizes a second field-of-view image in said second virtual 3D space as an image to be displayed on at least one sub-screen with some of said second display objects corresponding to some of said first display objects omitted from being displayed.

16. A three-dimensional(3D) simulator apparatus comprising:
virtual three-dimensional(3D) space computation means for computing and forming a virtual three-dimensional (3D) space by setting either position or position and orientation of a plurality of display objects configuring said virtual 3D space;
texture computation means for mapping texture to said display objects;
texture information storage means for storing information on said texture to be mapped by said texture computation means, and
image synthesis means for synthesizing a field-of-view image as seen from any desired viewpoint within said virtual 3D space, based on computation results from said virtual 3D space computation means, wherein:
said texture computation means uses texture information stored in said texture information storage means in common, for both high detailed display objects and low detailed display objects.

17. The three-dimensional simulator apparatus as defined in claim 16, wherein:
some of vertex texture coordinates for specifying texture mapped to said high detailed display objects are used as vertex texture coordinates for specifying texture mapped to said low detailed display objects.

18. A method of synthesizing an image, comprising:

a virtual three-dimensional(3D) space computation step for computing and forming virtual three-dimensional (3D) spaces by setting either position or position and orientation of a plurality of display objects configuring said virtual 3D spaces; and
an image synthesis step for synthesizing field-of-view images as seen from any desired viewpoint within said virtual 3D spaces, based on computation results from said virtual 3D spaces computation step, wherein:
said virtual 3D space computation step forms a first virtual 3D space configured by first display objects and a second virtual 3D space configured by second display objects, said first display objects and said second display objects being used to represent same display objects, but a degree of detail of said second display objects being lower than a degree of detail of said first display objects; and
said image synthesis step synthesizes a first field-of-view image in said first virtual 3D space with said high detailed first display objects, as an image to be displayed on a main screen and synthesizes a second field-of-view image in said second virtual 3D space with said low detailed second display objects, as an image to be displayed on at least one sub-screen.

19. The method of synthesizing an image as defined in claim 18, wherein:
said second virtual 3D space is formed by changing said first virtual 3D space partially.

20. A method of synthesizing an image, comprising:
a virtual three-dimensional(3D) space computation step for computing and forming virtual three-dimensional (3D) spaces by setting either position or position and orientation of a plurality of display objects configuring said virtual 3D spaces;
an image synthesis step for synthesizing field-of-view images as seen from any desired viewpoint within said virtual 3D spaces, based on computation results from said virtual 3D space computation step, wherein:
said virtual 3D space computation step forms a first virtual 3D space configured by first display objects and a second 3D space configured by second display objects, said first display objects and said second display objects being used to represent same display objects, but with some of said second display objects omitted from being placed in said second virtual 3D space while some of said first display objects corresponding to some of said second display objects being, place in said first virtual 3D space; and
said image synthesis step synthesizes a first field-of-view image in said first virtual 3D space, as an image to be displayed on a main screen with some of said first display objects being displayed and synthesizes a second field-of-view image in said second virtual 3D space, as an image to be displayed on at least one sub-screen with some of said second display objects corresponding to some of said first display objects omitted from being displayed.

21. A method of synthesizing an image, comprising:
a virtual three-dimensional(3D) space computation step for computing and forming a virtual three-dimensional (3D) space by setting either position or position and orientation of a plurality of display objects configuring said virtual 3D space;
texture computation step for mapping texture to said display objects, information on said texture to be mapped by said texture computation step being stored in texture information storage means; and an image synthesis step for synthesizing a field-of-view image as seen from any desired viewpoint within said virtual 3D space, such that computation results from said virtual 3D space computation step, wherein:

said texture computation step uses texture information stored in said texture information storage means in common, for both high detailed display objects and low detailed display objects.

22. The method of synthesizing an image as defined in claim 21, wherein:

some of vertex texture coordinates for specifying texture mapped to said high detailed display objects are used as vertex texture coordinates for specifying texture mapped to sad low detailed display objects.

\* \* \* \* \*